(12) United States Patent
Carr

(10) Patent No.: US 7,628,749 B2
(45) Date of Patent: Dec. 8, 2009

(54) SOLIDS RECOVERY USING CROSS-FLOW MICROFILTER AND AUTOMATIC PISTON DISCHARGE CENTRIFUGE

(75) Inventor: Robert B. Carr, Brookline, MA (US)

(73) Assignee: Wagner Development Inc., Monaco (MC)

( * ) Notice: Subject to any disclaimer, the term of this patent is extended or adjusted under 35 U.S.C. 154(b) by 619 days.

(21) Appl. No.: 11/634,363

(22) Filed: Dec. 5, 2006

(65) Prior Publication Data

US 2007/0114161 A1    May 24, 2007

Related U.S. Application Data

(63) Continuation-in-part of application No. 11/218,280, filed on Sep. 1, 2005, and a continuation-in-part of application No. PCT/IB2006/002411, filed on Aug. 25, 2006.

(60) Provisional application No. 60/742,558, filed on Dec. 5, 2005, provisional application No. 60/756,381, filed on Jan. 4, 2006.

(51) Int. Cl.
*B04B 7/16* (2006.01)
*B04B 11/05* (2006.01)
*B04B 11/08* (2006.01)

(52) U.S. Cl. .............. 494/25; 494/27; 494/36; 494/37; 494/50; 494/56; 494/65; 210/376

(58) Field of Classification Search ............ 494/37, 494/46, 50–52, 55–59, 62, 65, 67, 83, 84, 494/36, 23–30; 210/372–377
See application file for complete search history.

(56) References Cited

U.S. PATENT DOCUMENTS

| | | | |
|---|---|---|---|
| 1,909,188 A | 5/1933 | Roberts | |
| 2,040,351 A | 5/1936 | Williams | |
| 2,094,058 A | 9/1937 | Bryson | |
| 3,306,681 A | 2/1967 | Barringer | |
| 3,403,848 A | 10/1968 | Windsor et al. | |
| 3,539,096 A | 11/1970 | Lewis et al. | |

(Continued)

FOREIGN PATENT DOCUMENTS

| | | |
|---|---|---|
| CH | 604 906 | 9/1978 |
| DE | 35 33 306 A1 | 3/1987 |
| EP | 1 028 163 A1 | 2/1999 |
| JP | 63171656 | 7/1988 |
| JP | 7144150 | 6/1995 |

(Continued)

OTHER PUBLICATIONS

Can Powerfuge Brochure, Carr Separations, Inc., undated, p. 1-4.

(Continued)

*Primary Examiner*—Charles E Cooley
(74) *Attorney, Agent, or Firm*—Weingarten, Schurgin, Gagnebin & Lebovici LLP

(57) ABSTRACT

In a system for combined centrifugation and microfiltration, retentate from a cross-flow microfilter is fed to an automatic piston discharge centrifuge for solids removal, thereby enhancing the efficiency of both processes. The centrifuge includes a cylindrical bowl having a conical lower end with an opening through which feed liquid is injected. Solids separate from the feed liquid and accumulate along the inner surface of the bowl as the bowl rotates at high speed. A microfiltration membrane can be added to improve solids retention in the bowl and provide a filtered centrate. During solids discharge, a piston is urged downward along a vertical axis. The downward movement of the piston forces accumulated solids from the bowl via the opening in the conical lower end thereof.

32 Claims, 18 Drawing Sheets

U.S. PATENT DOCUMENTS

| | | | |
|---|---|---|---|
| 3,741,465 A | 6/1973 | Lincoln | |
| 3,770,191 A | 11/1973 | Blum | |
| 3,864,256 A * | 2/1975 | Hultsch et al. | 210/781 |
| 3,879,294 A * | 4/1975 | Ellis et al. | 210/354 |
| 3,972,514 A | 8/1976 | Voitsekhovsky et al. | |
| 4,155,503 A | 5/1979 | Sears | |
| 4,221,323 A * | 9/1980 | Courtot | 494/10 |
| 4,416,655 A | 11/1983 | Bennett | 494/40 |
| 4,493,768 A | 1/1985 | Kubr et al. | 210/360.2 |
| 4,493,769 A | 1/1985 | Paschedag et al. | 210/360.2 |
| 4,513,566 A | 4/1985 | Rajsigl et al. | |
| 4,687,463 A | 8/1987 | Simonnet | 494/83 |
| 4,692,247 A | 9/1987 | Orlans | 210/314 |
| 4,875,334 A | 10/1989 | Rajsigl et al. | |
| 4,915,844 A | 4/1990 | Imamura et al. | |
| 5,149,432 A * | 9/1992 | Lavin | 210/381 |
| 5,250,180 A | 10/1993 | Chang | 210/375 |
| 5,328,441 A | 7/1994 | Carr | 494/58 |
| 5,356,367 A | 10/1994 | Carr | 494/58 |
| 5,364,335 A | 11/1994 | Franzen et al. | 494/15 |
| 5,425,698 A | 6/1995 | Carr | 494/46 |
| 5,454,777 A | 10/1995 | Ziems et al. | 494/8 |
| 5,656,164 A * | 8/1997 | Vado et al. | 210/380.1 |
| 5,674,174 A | 10/1997 | Carr | 494/65 |
| 5,733,238 A | 3/1998 | Carr | 494/58 |
| 5,743,840 A | 4/1998 | Carr | 494/13 |
| 5,795,489 A | 8/1998 | Holm | |
| 5,879,279 A | 3/1999 | Berger et al. | 494/7 |
| 5,916,082 A | 6/1999 | Opfer | 494/26 |
| 6,126,587 A | 10/2000 | Berger et al. | 494/55 |
| 6,149,573 A | 11/2000 | Berger et al. | |
| 6,224,532 B1 | 5/2001 | Beattey | 494/50 |
| 6,248,054 B1 | 6/2001 | Berger et al. | 494/55 |
| 6,251,056 B1 | 6/2001 | Berger et al. | 494/55 |
| 6,461,286 B1 | 10/2002 | Beattey | 494/8 |
| 6,478,724 B1 | 11/2002 | Beattey | 494/55 |
| 6,632,166 B2 | 10/2003 | Carr | 494/37 |
| 6,776,752 B2 | 8/2004 | Carr | 494/38 |
| 6,932,757 B2 | 8/2005 | Beattey | 494/55 |
| 7,261,683 B2 * | 8/2007 | Carr | 494/50 |
| 2002/0016243 A1 * | 2/2002 | Carr | 494/37 |
| 2002/0017483 A1 | 2/2002 | Chesner et al. | |
| 2003/0017931 A1 | 1/2003 | Beattey | 494/55 |
| 2003/0127391 A1 | 7/2003 | Craft, Sr. et al. | |
| 2003/0195105 A1 * | 10/2003 | Carr | 494/38 |
| 2005/0003945 A1 | 1/2005 | Beattey | 494/55 |
| 2005/0009681 A1 * | 1/2005 | Carr | 494/46 |
| 2005/0043164 A1 | 2/2005 | Opfer | 494/55 |
| 2005/0233882 A1 * | 10/2005 | Carr | 494/50 |
| 2005/0233883 A1 | 10/2005 | Carr | 494/50 |
| 2007/0114161 A1 * | 5/2007 | Carr | 210/96.2 |

FOREIGN PATENT DOCUMENTS

| | | |
|---|---|---|
| JP | 8131894 | 5/1996 |
| JP | 8266936 | 10/1996 |
| JP | 9085189 | 3/1997 |
| JP | 2001-140704 | 5/2000 |
| JP | 2003-144973 | 5/2005 |
| WO | WO 00/38762 | 7/2000 |
| WO | WO 03/086641 A1 | 10/2003 |
| WO | WO 2006/046141 | 5/2006 |

OTHER PUBLICATIONS

Alfa-Laval CHPX Centrifuge Brochure, Alfa Laval, Inc., undated, p. 1.

Shanghai Centrifuge Institute, SCI Tube Bowl Centrifuge, Shanghai, China, undated, p. 1-2.

* cited by examiner

SOLIDS RECOVERY USING CROSS-FLOW MICROFILTER AND AUTOMATIC PISTON DISCHARGE CENTRIFUGE

CROSS REFERENCE TO RELATED APPLICATIONS

This application is a continuation-in-part of co-pending U.S. application Ser. No. 11/218,280, filed Sep. 1, 2005 and a continuation-in-part of International Application No. PCT/IB2006/002411 filed Aug. 25, 2006. This application claims the priority of U.S. Provisional Application No. 60/742,558 filed Dec. 5, 2005 and U.S. Provisional Application No. 60/756,381 filed Jan. 4, 2006. Each of the foregoing related applications is hereby incorporated by reference.

BACKGROUND OF THE INVENTION

Many different types of centrifugal separators are known for separating heterogeneous mixtures into components based on specific gravity. Typically, a heterogeneous mixture, which may also be referred to as feed material or liquid, is injected into a rotating bowl of a centrifugal separator. The rotating bowl spins at high speeds and forces components of the mixture that have a high specific gravity to separate therefrom by sedimentation. As a result, dense solids compress as a cake tightly against an inner surface or wall of the bowl and clarified liquid forms radially inward from the cake. The bowl may spin at speeds sufficient to produce forces 20,000 times greater than gravity so as to separate the solids from the centrate.

As solids accumulate along the wall of the bowl, the clarified liquid exits from the bowl and leaves the separator as "centrate." Once it is determined that a desired amount of solids has accumulated, the separator is placed in a discharge mode in which the solids are removed from the separator. Often, for example, an internal scraper is engaged to scrape the solids from the walls of the bowl.

Conventional separators have many shortcomings when discharging particular kinds of solids and liquids. For example, some separators may not be capable of completely discharging solids that are sticky, which can result in poor yields. A poor yield can be especially problematic for high-value solids such as those encountered in pharmaceutical processes. Traditional separators also subject a feed material to very high shear forces when accelerating the material to the rotational speed of the bowl, which can damage, for example, sensitive chemical or biological substances such as intact cells.

Still, other separators do not provide a convenient means by which to handle and recover sensitive solids. For example, an operator is commonly used to assist with solids discharge and recovery. Separators that require such operator intervention often suffer from contamination problems. Furthermore, some separators employ numerous mechanical components to facilitate solids recovery, which can affect separator durability. Such components are usually external to the separator or in the form of add-on equipment that poses both size and compatibility issues. Conventional separators also tend to be difficult to clean or sterilize without significantly increasing maintenance costs.

It would be desirable to have a centrifugal separator that can be effectively used with solids of the type described above, namely, those that result in sticky accumulations or are sensitive to shear forces generated during centrifugation. It would also be useful to have a separator that can easily recover such solids without the possibility of external contamination or additional mechanical equipment. Such a separator should also be able to be conveniently cleaned or sterilized-in-place.

Furthermore, typical cross-flow microfiltration systems employ pretreatment of feed liquid to ensure the solids concentration is sufficiently below a threshold at which the filter membrane would become fouled. Backwashing is often necessary to reduce the concentration of accumulated solids on the filter membrane, causing delays in processing. In addition, some mechanism must be provided to extract accumulated solids, such as from a retentate tank. Such mechanisms previously have resulted in removed solids wetted by a relatively significant amount of retentate. The provision of pretreatment liquid and such a solids removal mechanism result in increased processing time, complexity, and cost while providing suboptimal solids drying performance.

SUMMARY OF THE INVENTION

To alleviate the problems associated with previous microfiltration systems, the presently disclosed system employs an automatic piston discharge (APD) centrifuge in conjunction with a microfiltration system. As solids concentration in the retentate, as detected by turbidity or density measurements, reaches a threshold, the retentate is directed to the centrifuge where highly efficient separation occurs. Alternatively or in addition, the pressure of the clear filtrate can be monitored as an indication of the accumulation of solids and the need for solids removal using the centrifuge. The dry solids are removed through the solids discharge cycle of the centrifuge, and the removed centrate is analyzed for suspended solids. If present, the centrate is returned to the process path. Otherwise, the clear centrate is removed from the system.

Since solids build-up on the filter membrane is avoided, a higher throughput through the microfilter is achieved. The solids removed by the centrifuge are significantly drier as compared to prior art methods. Since the feed stream is concentrated, a relatively small centrifuge can be employed. With such dynamic control over the retentate solids concentration, there is less need for a large retentate tank, further contributing to cost savings.

In accordance with the present invention, a system is provided for the isolation and recovery of solid and/or liquid components from a solids-containing suspension by combined microfiltration and centrifugation. The system comprises a microfiltration subsystem and a centrifugation subsystem.

The microfiltration subsystem comprises a cross-flow microfilter, a retentate tank, a retentate pump, a first valve, and a first sensor. The microfilter has a feed input for introduction of the suspension to the system, a filtrate output for diverting filtrate from the system, and a retentate output. The retentate tank is fed from the retentate output of the microfilter. The retentate pump is fed from an output of the retentate tank. The first valve is fluidly connected to the output of the retentate pump. The first sensor senses the solids concentration in the retentate and controls the first valve. Below a first preset solids concentration, the first valve returns the retentate to the feed input of the microfilter. Above the first preset solids concentration, the first valve diverts the retentate to the centrifugation subsystem.

The centrifugation subsystem comprises an automatic piston discharge centrifuge having a feed input, a solids discharge output for diverting solids from the system, and a centrate output. The centrifugation subsystem further comprises a second valve that is fluidly connected to the centrate output, and a second sensor capable of sensing the solids concentration in the centrate output and controlling the second valve. Above a second preset solids concentration, the second valve returns the centrate to the retentate tank. Below the second preset solids concentration, the second valve diverts the centrate from the system.

Another aspect of the invention is a method of recovering a solid component or a liquid component from a solids-containing suspension by combined microfiltration and centrifugation. The method comprises the steps of providing a system comprising a microfiltration subsystem and a centrifugation subsystem as described above, adding the solids-containing suspension to the retentate tank, pumping the suspension through the microfilter with the retentate pump; sensing the solids concentration in the retentate with the first sensor, sensing the solids concentration in the centrate with the second sensor, collecting filtrate from the microfilter, collecting centrate from the centrifuge, and collecting solids from the centrifuge. If the solids concentration in the retentate is below a first preset solids concentration, the first valve is adjusted to return the retentate to the feed input of the microfilter. If the solids concentration of the retentate is above the first preset solids concentration, the first valve is adjusted to divert the retentate to the centrifugation subsystem. If the solids concentration of the centrate is above a second preset solids concentration, the second valve returns the centrate to the retentate tank. If the solids concentration of the centrate is below the second preset solids concentration, the second valve is adjusted to divert the centrate for collection.

In yet another aspect, the present invention provides an automatic piston discharge centrifuge, comprising a bowl, a solids discharge assembly, a microfilter, a diaphragm, and a solids discharge valve. The cylindrical bowl has a lower end with an opening and is operative during a feed mode of operation to rotate at a high speed to separate solids from feed liquid; solids accumulate along an inner surface of the bowl. The solids discharge assembly comprises a cylindrical outer piston movably disposed against the inner surface of the bowl, and an inner piston disposed at the end of a shaft which extends along the axis of the bowl. The inner piston has a substantially cylindrical portion and a substantially conical portion. The microfilter is cylindrically disposed about the axis of the bowl and retains solids in an outer gap between an outer surface of the microfilter and the inner surface of the bowl. The microfilter allows a filtered centrate to exit the bowl through an inner gap adjacent to an inner surface of the microfilter. The outer diameter of the microfilter is less than the inner diameter of the outer piston. The diaphragm is cylindrically disposed about the axis of the bowl and is adjacent to the inner gap.

Further in accordance with the present invention, a centrifugal separator is disclosed that performs well with sticky solids and exhibits low-shear acceleration of feed material. The separator can be particularly useful for sensitive solids such as chemical or biological substances. A separator of the invention can recover sensitive solids, liquids, materials or combinations thereof without operator intervention or additional mechanical equipment. The separator can also be conveniently cleaned or sterilized-in-place.

The separator can include a cylindrical bowl having a conical lower end with an opening through which feed material or liquid is injected during a feed mode of operation. As the bowl spins or rotates at a high speed, the injected feed liquid encounters a sloped surface of the conical lower end of the bowl. Rotational acceleration forces are imparted relatively gradually as the liquid continues its movement radially outward. Solids then separate from the feed liquid and accumulate along the inner surface of the bowl, for example, as a cake.

Additionally, the separator can include a piston assembly disposed within the bowl in tight-fitting relationship with an inner surface thereof. The piston features an upper portion and a lower conical portion that are contacted by pneumatic or hydraulic pressure during different modes of separator operation. For example, in a solids discharge mode, fluid such as compressed gas or hydraulic liquid acts against the upper portion of the piston urging it axially downward to force accumulated solids from the bowl via the opening in the conical lower end thereof. Exemplary types of compressed gas for moving the piston include nitrogen and argon. Similarly, an exemplary hydraulic liquid for moving the piston in the bowl can include distilled water. In one embodiment, the lower end of the bowl and lower portion of the piston have complementary shapes to promote relatively complete discharge of solids. For example, the lower end of the bowl and lower portion of the piston can feature substantially frusto-conical shapes.

For a separator of the invention, the piston can be held in an uppermost position during a feed mode of operation by hydraulic pressure from the feed liquid as well as frictional forces between one or more piston seals and the inner surface or wall of the bowl. Such seals can be disposed about the piston and adjacent to the inner surface of the bowl. The piston includes a centrate valve that can be urged open during the feed mode to permit the feed liquid, after solids have been separated therefrom, to flow out of the bowl as clarified liquid and into a centrate case having a passage leading to a centrate outlet port. As the piston is urged downward by fluid acting against the upper portion thereof during solids discharge, the centrate valve automatically closes to prevent accumulated solids from passing into the centrate case.

With the piston held in its uppermost position, it is permitted to rotate with the bowl as high speed rotational separation of the solids from the feed liquid is performed. During the feed mode and solids separation, clarified liquid exits the bowl and enters the centrate case. The centrate case can also include an isolation valve that may be urged open or closed by pneumatic or hydraulic pressure. For example, the isolation valve is open in the feed mode to allow clarified liquid to flow through the centrate outlet port and an open centrate outlet port valve to exit the separator as centrate. As the feed mode concludes, hydraulic pressure from the feed liquid is reduced such that the piston is held substantially in its uppermost position by frictional forces between one or more piston seals and the inner wall of the bowl as well as any solids accumulated within the bowl. When the feed mode of operation is complete, the bowl stops rotating and remaining or residual liquid in the separator flows by gravity through the opening in the conical lower end thereof.

The separator can also feature a divert assembly including a solids divert valve movably located below a rotatable residual divert valve when the residual divert valve is at the opening in the conical lower end of the bowl. As residual liquid drains from the bowl, the residual divert valve is in a closed position to permit the liquid to flow from the bowl and into a residual liquid drain passage. The liquid drain passage leads into a drain port, where residual liquid exits the separator. The solids discharge mode of operation can, for example, begin after the residual liquid has substantially drained from the separator bowl.

In the solids discharge mode, a residual divert valve actuator rotates the residual divert valve to an open position such that the solids divert valve can be urged upward, by a solids divert piston, into communication with the opening in the bowl. The centrate outlet port valve is then closed and a solids outlet port valve for the divert assembly is opened. The isolation valve is also urged closed by fluid such as compressed gas or hydraulic liquid acting against an annular member associated with the isolation valve, which controls its actuation and movement. In addition, as described above, the piston is urged downward along a vertical axis during solids discharge by fluid acting against the upper portion thereof. The piston subsequently pushes or "pumps" accumulated solids from the bowl into a solids passage leading to a solids outlet port that features the open solids outlet port valve.

In one embodiment, a solids discharge assembly for the separator features the piston movably disposed against the inner surface of the bowl. The piston can comprise an upper portion and a lower portion. The solids discharge assembly can also feature a driving port operative for introducing fluid into the bowl above the upper portion of the piston. When fluid pressure in the bowl above the upper portion of the piston is increased relative to that below the lower portion of the piston, the piston moves within the bowl. For example, during solids discharge, introduction of fluid into the bowl above the upper portion of the piston can move the piston axially downward. Preferably, the piston is urged axially downward with respect to the bowl. As described above, during the solids discharge mode of operation, introduction of fluid into the bowl above its upper portion causes the piston to push solids accumulated along the inner surface of the bowl.

The solids discharge assembly can also comprise a port operative for introducing fluid into the bowl below the lower portion of the piston. When fluid pressure in the bowl below the lower portion of the piston is increased relative to that above the upper portion of the piston, the piston moves within the bowl. For example, introduction of fluid into the bowl below the lower portion of the piston can cause the piston to move toward an upper end of the bowl. In another embodiment, the separator can also comprise a valve in an upper end region thereof, which is operable to enable pressurization of the bowl above the upper portion of the piston. Such a valve can be actuated in response to fluid pressure applied against an annular member operably associated therewith.

In another embodiment, the separator of the invention can comprise a cylindrical bowl having a lower end with an opening. During the feed mode of operation, the bowl is operative to rotate at a high speed to separate solids from feed liquid. As described above, the solids accumulate along the inner surface of the bowl. The separator can also feature a solids discharge assembly and first valve member, which defines a drain passage. The drain passage is operative to permit liquid to drain from the opening in the bowl when the first valve member is in a closed position. Preferably, the opening in the bowl and the drain passage are configurable to enable liquid to drain by gravity from the bowl into the passage.

The first valve member can also define a feed passage that cooperates with or is proximate to the opening in the bowl during the feed mode of operation. The feed passage permits feed liquid to be injected into the bowl. The first valve member can also be operatively coupleable to a valve actuator for rotating the member about a rotational axis. In one embodiment, the separator can also comprise a second valve member that cooperates with a lower surface of the first valve member when the first valve member is in a closed position. Moreover, the separator can feature a valve piston having an uppermost end at which the second valve member is proximately disposed. The valve piston can be operative to move the second valve member with respect to the bowl. For example, during solids discharge, the valve piston can move the second valve member upward along a vertical axis to cooperate with the opening in the bowl. Similarly, during the feed mode of operation, the first valve member is in the closed position and defines the feed passage, which, as describe above, can cooperate with the opening in the bowl to permit feed liquid to be injected therein.

In one embodiment, the separator of the invention can comprise a first passage partially disposed within the valve piston. For example, the first passage can cooperate with the second valve member at the uppermost end of the valve piston. The opening in the separator bowl and the first passage can also be configurable to enable solids from the bowl to pass through the first passage during solids discharge. The first passage can also cooperate with a second passage that is partially disposed in the valve piston such that fluid introduced through a port for the second passage may enter the first passage so as to contact solids therein. Preferably, fluid introduced through the port for the second passage enters the first passage to contact solids therein when a valve member of the first passage is open. The valve piston of the separator can also feature an annular flange disposed thereabout such that the valve piston moves in response to fluid pressure applied against the annular flange.

In one embodiment, the separator also comprises a first passage partially disposed within the valve piston. The first passage can cooperate with the second valve member, for example, at the uppermost end of the valve piston, and a second passage partially disposed within the valve piston. Preferably, when a valve member of the first passage is closed, fluid introduced through a port for the second passage enters the bowl below the lower portion of the piston. Fluid introduced through the port increases fluid pressure in the bowl below the lower portion of the piston relative to that above the upper portion thereof so as to cause the piston to move toward an upper end of the bowl.

The invention also provides a method for discharging solids from a centrifugal separator. In one embodiment, the method comprises providing the separator and/or solids discharge assembly described above and introducing fluid through the driving port to increase fluid pressure in the bowl above the upper portion of the piston relative to that below the lower portion thereof so as to cause the piston to move within the bowl. The method can also comprise discharging solids accumulated along the inner surface of the bowl. Additionally, the method features injecting feed liquid into the bowl for solids separation by high speed rotation of the bowl. Preferably, the feed liquid is injected into the bowl prior to introducing fluid through the driving port. A method of the invention also includes returning the piston substantially to an uppermost position. The piston can be returned substantially to its uppermost position by introducing fluid into the bowl below the lower portion of the piston so as to increase fluid pressure in the bowl below the lower portion of the piston relative to that above the upper portion thereof. The piston is preferably returned substantially to its uppermost position after discharging solids accumulated along the inner surface of the bowl. The invention also contemplates carrying out the above method in any particular order or manner.

DESCRIPTION OF THE DRAWINGS

Other features and advantages of the present invention will be apparent from the following detailed description of the invention, taken in conjunction with the accompanying drawings of which.

DETAILED DESCRIPTION OF THE INVENTION

Figure 1:
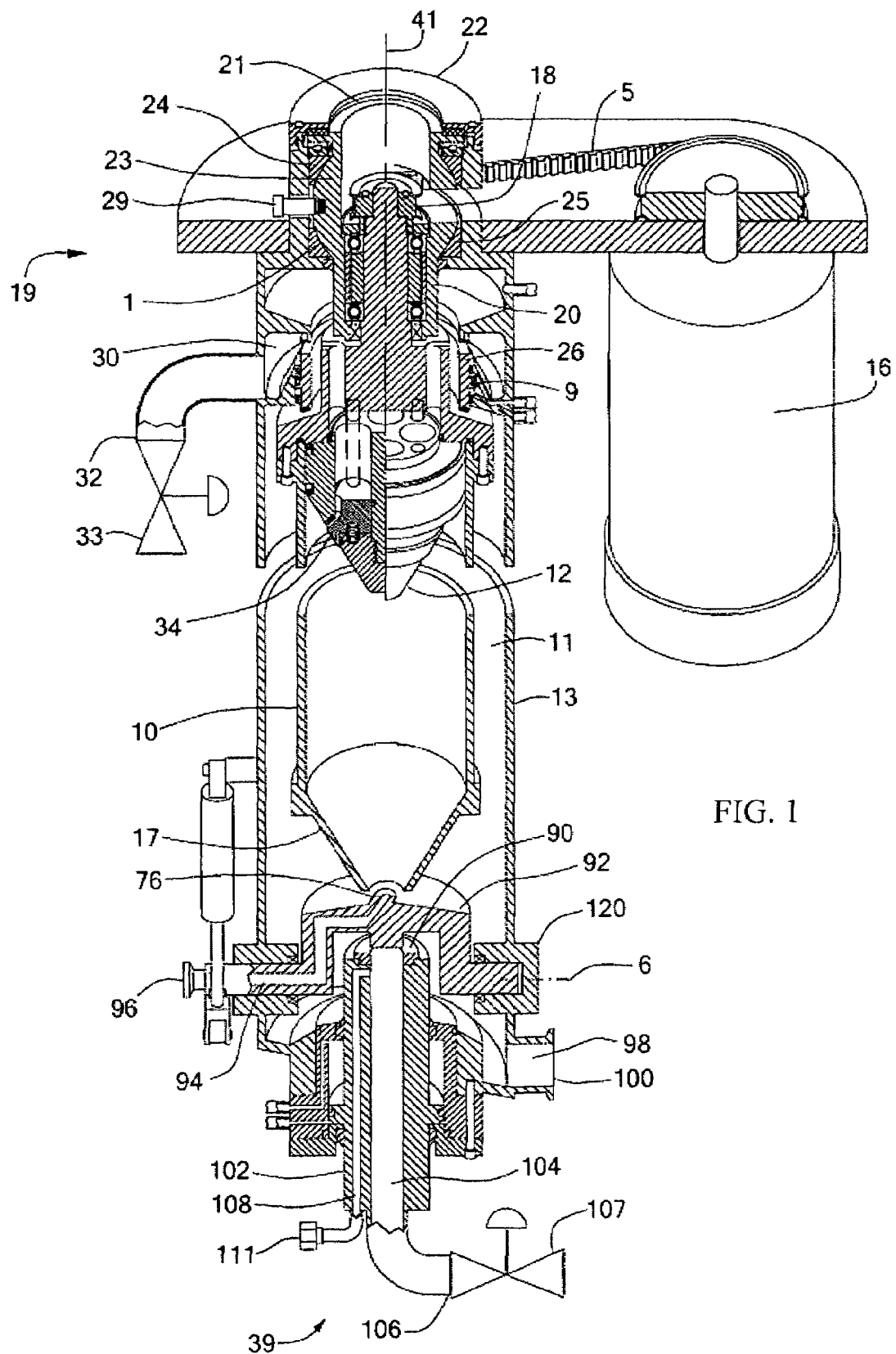
FIG. 1 is a section view of a centrifugal separator embodiment in accordance with the invention.

FIG. 1 shows a centrifugal separator in vertical section, with a middle portion removed so as to illustrate a horizontal section as well. The centrifugal separator includes a cylindrical separator bowl 10 mounted in a central region 11 of a separator housing 13. Preferably, the separator bowl can be of a length that is greater than a diameter thereof. By having the length of the bowl longer than its diameter, "end effects" in the bowl can be minimized with respect to the bowl's internal volume. In general, end effects can be caused by fluid eddies along any of the angled portions within the interior of the bowl and, particularly, near the ends thereof. In one embodiment, the separator bowl 10 can be a cylindrical type bowl having a relatively small diameter D and a length L such that the ratio of L/D is approximately 5/1 or greater. Such a ratio of L/D tends to prevent axial waves from developing within the bowl as such waves substantially dissipate as they travel the length of the bowl. By employing an L/D ratio of approximately 5/1 or greater, a separator of the invention can also avoid the need for baffles within the bowl, which are used in conventional separators to minimize axial waves.

The separator in FIG. 1 also includes a piston assembly comprising a piston 12. As shown, the piston 12 can have a lower conical portion that matches the shape of a conical lower end 17 of the bowl 10. The conical lower end 17 acts as a rotational accelerator of the feed liquid during a feed mode of operation for the separator. The separator can also feature, in an upper portion 19, a centrate case 30 having an isolation valve 26 that is urged open or closed by pneumatic or hydraulic pressure.

A variable speed drive motor 16 can also be connected by a drive belt 5 to a drive pulley 18 of a mounted bearing and spindle assembly 23 located at a collar-like extension 22 of the upper end for the separator housing 13. A separator of the invention can also be operated using other conventional motor and drive systems. Preferably, the bearing and spindle assembly 23 can comprise a semi-spherical portion 1 and a short cylindrical spindle portion 20, although other suitable assembly configurations could be used in accordance with the invention. In one embodiment, the semi-spherical portion comprises an upper semi-hemispherical portion and a lower semi-hemispherical portion. Optionally, the semi-spherical portion 1 can rest against mating surfaces of one or more seats. For example, FIG. 1 shows seats 24 and 25 in compressive contact with the upper and lower semi-hemispherical portion, respectively, of the semi-spherical portion 1. An exemplary semi-spherical portion that can be employed in a separator of the invention has been described by U.S. application Ser. No. 10/874,150, which is hereby incorporated by reference herein.

Exemplary seats 24 and 25 can comprise low friction components such as polytetrafluoroethylene (PTFE) or TEFLON-based (E. I. du Pont de Nemours and Company, 1007 Market Street, Wilmington, Del. 19898) materials such that they allow some extent of shifting of the semi-spherical portion 1 about a central vertical axis 41 of the separator. Seats 24 and 25 tend to prevent the semi-spherical portion 1 from processing radially outward and axially upward or downward. Moreover, seats 24 and 25 can limit the amount of vertical and horizontal swiveling of the spindle portion 20 as it rotates about the central vertical axis 41 of the separator at high speed during operation. Swiveling of the spindle portion 20 may also be dampened by an optional swing resistant ring 21 made, for example, of rubber. By preventing such radial or axial processing and limiting the amount of swiveling, vibration associated with the natural frequency of the rotating bowl 10 can be reduced. Seats 24 and 25 can also, for example, be arched seating elements that substantially prevent translation such as rotational translation of the assembly 23 or housing thereof. Generally, preventing such translation can operatively stabilize the semi-spherical portion 1.

In one embodiment, seats 24 and 25 can be formed as continuous ring members, discrete stabilizing members or any combination of such members. Seats 24 and 25 can also be adjustable such that their compressive contact with the semi-spherical portion 1 can be modified depending, for example, on particular process requirements for the separator. Such adjustability of seats 24 and 25 can be facilitated by, for example, the use of one or more adjustment members associated therewith. As described above, the invention also contemplates employing an individual seat that may be in compressive contact with the upper and/or lower semi-hemispherical portion of the semi-spherical portion 1.

Rotation of the mounted bearing and spindle assembly 23 can also be prevented by, for example, a positioning member such as an anti-rotation pin 29. For example, FIG. 1 shows pin 29 positioned so as to extend through an enlarged opening in the assembly 23. In one embodiment, such a positioning member can cooperate with a mounting region for the bearing and spindle assembly 23 to substantially prevent translation, for example, rotational translation, of the assembly 23 or housing thereof. As shown, the anti-rotation pin 29 can move within the opening in the assembly 23 so that it does not interfere with the swiveling of the spindle portion 20. The extent of rotation and swiveling experienced by the separator can relate to the speed at which high speed separation occurs. The drive motor 16 can also be controllably operated to rotate the separator bowl 10 at desired speeds for separation of the feed liquid.

Also shown in FIG. 1 are the centrate case 30, a centrate outlet port 32, a centrate outlet port valve 33 and a centrate valve 34, all of which are, during operation, involved in removing clarified liquid from the bowl 10 and centrate from the separator. As described in greater detail below, the centrate case 30 includes an isolation valve 26 that is open as the feed liquid enters the bowl 10 in the feed mode. The isolation valve 26 can comprise an annular member 9, preferably, disposed thereabout. During the feed mode, the centrate outlet port valve 33 is also maintained open. In contrast, the isolation valve 26 and centrate outlet port valves 33 both close when solids are pumped from the separator. The isolation valve is described in greater detail below with reference to FIG. 10, which shows the upper portion 19 of the separator during the feed mode. The centrate outlet port valve 33 can be closed manually or via a conventional automatic valve control assembly. The separator further comprises a lower end region 39 of the separator housing 13.

FIG. 1 also illustrates an embodiment of the separator having, for example, a solids divert valve 90 movably located in the lower end region 39 of the separator housing 13, below a lower surface of a rotatable residual divert valve 92. Optionally, the lower surface of the residual divert valve 92 can have a feature that partially extends within the solids divert valve 90. The residual divert valve 92 located at an opening 76 in the conical lower end 17 of the bowl 10 is shown in a closed position, which is maintained during the feed mode. When closed, the valve 92 defines a feed liquid passage 94 in communication with a feed liquid port 96, as well as a residual drain passage 98 in communication with a residual liquid drain port 100. The residual divert valve 92 can also be disposed to communicate within valve receiving member 120, which may be provided integrally with the lower end 39 of the separator housing 13. The valve 92 can also be rotated from its closed position about axis 6 such that the solids divert valve 90 can be urged upward into communication with the opening 76 to the bowl.

The separator of the invention can also comprise, as shown in FIG. 1, a solids passage 104, preferably, disposed axially within a solids divert piston 102 and extending beyond the divert piston 102 at a lowermost end to incorporate a solids outlet port 106 and a solids outlet port valve 107. The passage 104, piston 102, port 106 and valve 107 are each involved in removing accumulated solids from the centrifugal separator during the solids discharge mode of operation. While solids are pumped from the separator bowl 10, the solids outlet port valve 107 can be open to, for example, allow solids to pass from the solids passage 104 through the solids outlet port 106 to exit the separator.

The solids outlet port valve 107 may be opened manually or via a conventional automatic valve control assembly. The solids discharge mode generally pumps and recovers sensitive solids, such as, for example, intact cells, and can, for example, pass these solids onto another process or a storage vessel without further handling. Without the solids being handled by an operator, they are less likely to be damaged or contaminated. A separator of the invention such as, for example, the separator of FIG. 1 can also feature any configuration or arrangement of passages, valves, pistons, actuators, assemblies, ports, members and so forth, as described above, that would be suitable for a particular application.

A cleaning passage 108 can also be disposed within the solids divert piston 102, preferably, parallel to the solids passage 104 and, optionally, extending beyond the piston 102 at a lowermost end to incorporate a cleaning port 111. At an uppermost end, the cleaning passage 108 may be in communication with the solids passage 104. The cleaning port 111 and passage 108 together can aid in the recovery of any solids remaining in the passage 104 following the solids discharge mode, as well as in cleaning or sterilizing the separator. The cleaning port 111 and passage 108 can also operate to urge the piston 12 axially upward once the solids discharge mode is complete.

In particular, after solids are pumped from the separator, the solids outlet port valve 107 can be closed such that fluid, for example, compressed gas or hydraulic liquid, introduced through the cleaning port 111 and passage 108 contacts the lower conical portion of the piston 12 and urges the piston upward until it is returned substantially to an uppermost position for the next feed mode of operation. Exemplary types of compressed gas for moving the piston 12 include nitrogen and argon. Similarly, an exemplary hydraulic liquid that can be used to move the piston 12 within the bowl 10 can include distilled water.

In another embodiment, a separator of the invention can feature, for example, a pinch or ball type valve assembly to facilitate solids discharge. A conventional pinch type valve assembly may be preferable for a separator encountering paste-like solids during operation. An exemplary ball type valve assembly can comprise a half-ball shaped discharge valve disposed in the lower end region of the separator housing. The discharge valve of a ball type valve assembly can also include passages for the feed liquid and residual liquid being drained from the separator bowl. For example, the discharge valve can rotate between a closed and an open position during, respectively, the feed mode and solids discharge mode of operation.

During the feed mode, the separator housing can be closed except for the feed and residual liquid passages of the ball type valve assembly, which may communicate with, for example, the opening in the conical lower end of bowl. A ball type valve assembly can also include, for example, one or more ports for piston retraction and cleaning or sterilizing the separator. An exemplary ball type valve assembly that can be employed in a separator of the invention has been described by U.S. Pat. No. 6,776,752, which is hereby incorporated by reference herein.

Figure 2:
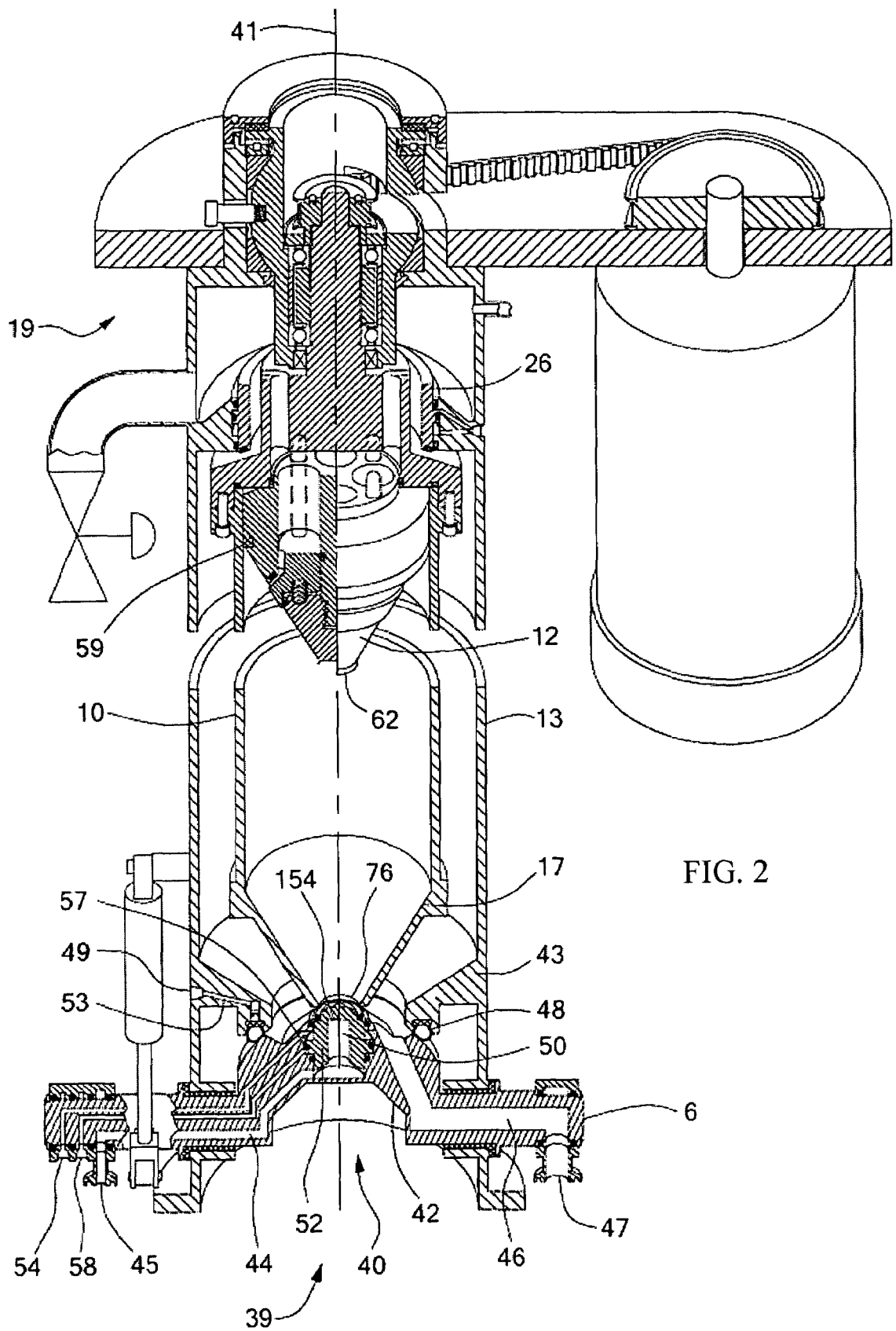
FIG. 2 is a section view of a centrifugal separator embodiment in accordance with the invention.

FIG. 2 shows one embodiment of a separator of the invention comprising ball type valve assembly 40 disposed in the lower end region 39 of the separator housing 13. Preferably, the ball type valve assembly 40 features, as shown, a discharge valve 42. For example, the discharge valve 42 can be mounted below an inward-facing flange 43. In one embodiment, the discharge valve 42 can incorporate a feed liquid passage 44 in communication with a feed liquid port 45, as well as a residual liquid drain passage 46 in communication with a residual liquid drain port 47. A valve seal 48 can also be disposed on a lower surface of the flange 43.

During the feed mode, the separator of FIG. 2 features the discharge valve 42 in a closed position in which its outer upper surface rests against the valve seal 48. The valve seal 48 can be inflated by fluid such as, for example, compressed gas or hydraulic liquid introduced through a valve actuator 49. Preferably, the valve seal 48 remains inflated throughout the feed mode. FIG. 2 shows that solids-bearing feed liquid can be introduced through the feed liquid port 45. The feed liquid can flow from the feed liquid port 45 into the feed liquid passage 44. Preferably, the feed liquid passage 44 communicates with a main passage 50, which can be axially disposed within a piston retract actuator 52. An upper end of the main passage 50 incorporates a jet port 154 for, during the feed mode, injecting feed liquid into the opening 76 in the conical lower end 17 of the bowl 10.

The feed mode of operation for a separator of the invention is described in greater detail below with reference to FIG. 4, which shows an embodiment of the separator featuring the solids divert valve movably located in the lower end region 39 of the separator housing 13, below a lower surface of the rotatable residual divert valve. With regard to FIG. 2, the feed mode can, for example, be further characterized by having the piston retract actuator 52 in contact with the conical lower end 17 of the separator bowl 10. As shown, the piston retract actuator 52 can move axially upward and downward in response to fluid such as, for example, compressed gas or hydraulic liquid.

After solids have been separated from the feed liquid, the piston remains in contact with the separator bowl 10 as residual liquid in the bowl drains through the opening 76 onto a shaped surface of the discharge valve 42, which also remains, as described above, in a closed position. As shown in FIG. 2, residual liquid can then be channeled by the shaped surface of the discharge valve 42 so as to pass through the residual liquid drain passage 46. The residual liquid passes through the drain passage 46 and eventually exits the separator through the residual liquid drain port 47.

In one embodiment, fluid pressure introduced at a fluid port 58 acts against a lower surface of an annular actuator flange 57 disposed about the piston retract actuator 52 to urge the retract actuator 52 upward. The axial movement of the piston retract actuator 52 may also be controlled by fluid introduced through an actuator control port 54. For example, the actuator control port 54 can be provided in the lower end region 39 of the separator housing 13 such that fluid enters the port 54 and contacts an upper surface of the annular actuator flange 57 disposed about the piston retract actuator 52.

The actuator control 54 and fluid port 58 can also act in concert to actuate and move the piston retract actuator 52 by concomitantly contacting the upper and lower surfaces of the annular actuator flange 57 fluid. For example, the piston retract actuator 52 can be urged upward when pressure acting against the upper surface of the annular actuator flange 57 is less than that acting against the lower surface thereof. During the feed mode, the piston retract actuator 52 can be urged axially upward and held in gas-tight communication with the opening 76 of the bowl 10. The interface of the piston retract actuator 52 and the bowl opening 76 can also be sealed by, for example, PTFE or TEFLON-based (E. I. du Pont de Nemours and Company, 1007 Market Street, Wilmington, Del. 19898) elastomeric seals disposed therebetween.

Preferably, the piston retract actuator 52 is also in gas-tight communication with the opening 76 of the bowl 10 while the piston 12 is being returned substantially to its uppermost position, which generally follows the solids discharge mode. As described above, such gas-tight communication can be achieved via fluid pressure introduced through the fluid port 58, which acts against the lower surface of the annular actuator flange 57 disposed about the piston retract actuator 52. Although fluid may also enter the separator at the actuator control port 54, the pressure exerted on the upper surface of the flange 57 would be less than that acting against its lower surface to maintain the gas-tight communication. It could also be preferable for the actuator control port 54 not to introduce fluid to the upper surface of the flange 57 such that the fluid port 58 would entirely control the movement of the piston retract actuator 52.

To return the piston 12 substantially to its uppermost position, fluid contacts the lower conical portion of the piston 12 after entering the separator bowl 10 via the feed liquid port 45 after fluid pressure urges the piston retract actuator 52 upward along the vertical axis 41 to communicate with the bowl opening 76. When the piston is returned substantially to its uppermost position, fluid introduced through the feed liquid port 45 can be discontinued. The piston 12 is then held substantially in its uppermost position by frictional forces between one or more piston seals adjacent the inner wall of the bowl 10. As shown in FIG. 2, an annular piston seal 59 is disposed about the piston 12 and interfaces with the inner wall of the bowl 10. The seal 59 can comprise components such as, for example, PTFE or TEFLON-based (E. I. du Pont de Nemours and Company, 1007 Market Street, Wilmington, Del. 19898) elastomeric materials.

Prior to returning the piston 12 substantially to its uppermost position, the separator is typically operated in the solids discharge mode in which solids are pumped from the bowl 10. In the separator of the invention shown in FIG. 2, the solids discharge mode is characterized by the discharge valve 42 rotated about a rotational axis 6 to an open position such that solids can leave the separator as the piston 12 travels axially downward. The separator can also be readily cleaned or sterilized-in-place, preferably, after the solids discharge mode, with the discharge valve 42 rotated into an open position.

For example, in order to rotate the discharge valve 42 from a closed position, during the feed mode, to an open position, during the solids discharge mode, the valve seal 48 can be deflated. The valve seal can be deflated by, for example, discontinuing the introduction of fluid at the valve actuator 49. An upper offset portion of the discharge valve 42, which can include the piston retract actuator 52, is then preferably rotated 90° about the rotational axis 6, away from the opening defined by the inner edge of the flange 43. In one embodiment, prior to rotating the discharge valve 42 to an open position for the solids discharge mode, the piston retract actuator 52 is removed from gas-tight communication with the opening 76 of the bowl 10. The actuator 52 can move axially downward away from the bowl 10, for example, as described above.

With the piston retract actuator 52 removed from gas-tight communication with the bowl opening 76 and the discharge valve 42 rotated to an open position, solids can be pumped from the separator through the conical lower end 17 of the bowl 10. Preferably, solids are pumped from the separator bowl as the piston 12 travels axially downward. In general, the solids discharge mode begins in the upper portion 19 of the separator such as described in greater detail below with reference to the separator in FIG. 7. As shown in FIG. 2, the piston 12 can also feature a knife-edge 62, which may aid in the separation of exceptionally paste-like solids that stick near the conical lower end 17 or at the opening 76 of the separator bowl 10.

Figure 3:
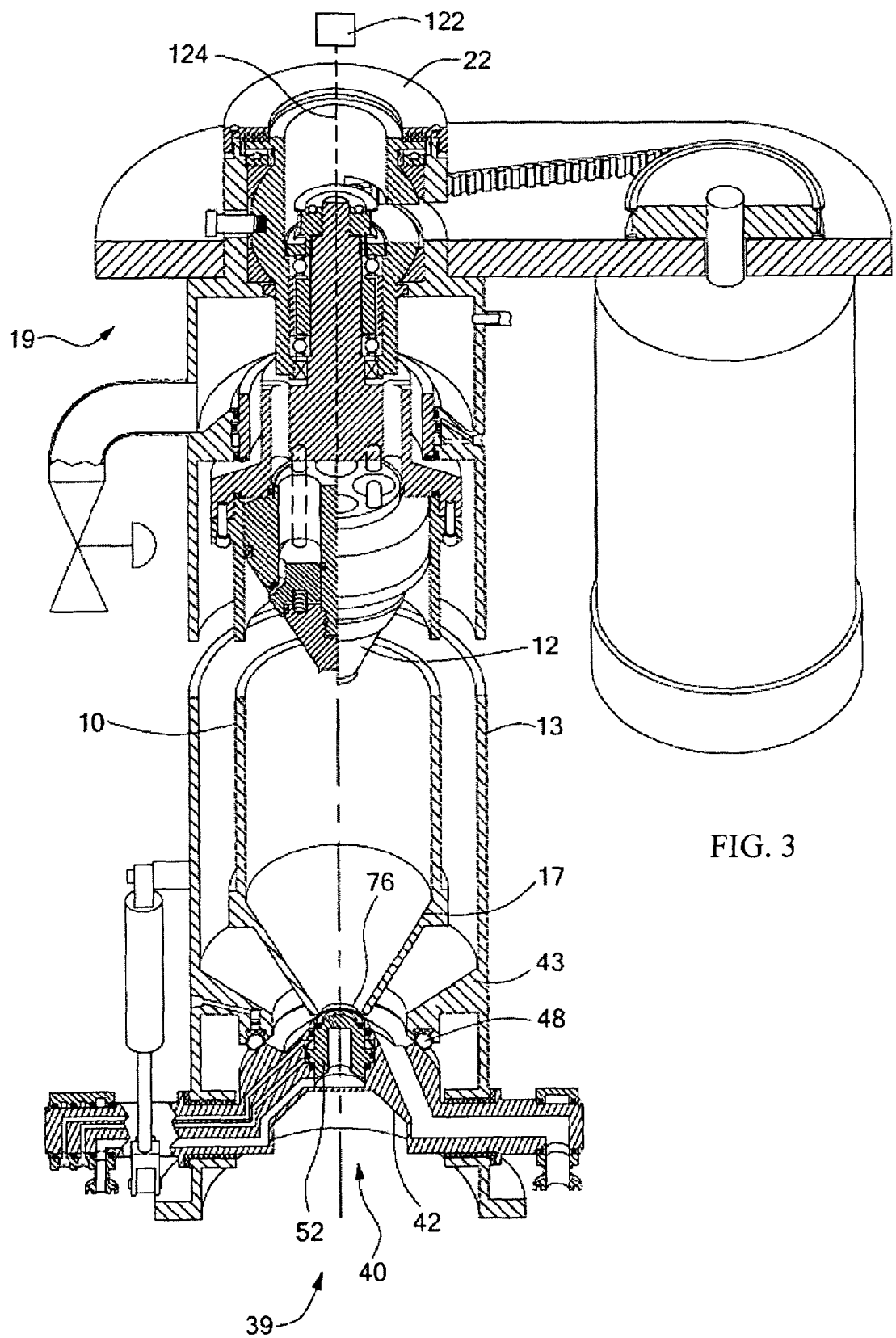
FIG. 3 is a section view of the separator in FIG. 2 featuring a laser sensor assembly.

FIG. 3 is a section view of the separator of FIG. 2 featuring a laser sensor assembly 122. For example, the assembly 122 can be mounted within or external to the separator housing 13 by any suitable means. In general, optical elements such as, for example, focusing and reflecting members can be used to facilitate any suitable mounting options, configurations or arrangements for the assembly 122. As shown, the laser sensor assembly can be disposed above or at the upper portion 19 of the separator. Preferably, the assembly 122 is disposed above the collar-like extension 22 of the upper end for the separator housing 13. The laser sensor assembly 122 can be used to monitor the axial movement of the piston 12 within the separator bowl 10. In one embodiment, the separator can, for example, be any conventional type of laser light emitting device.

For example, the laser sensor assembly 122 of FIG. 3 can monitor the axial movement of the piston 12 by emitting a pulsed laser light 124. As will be appreciated by those of ordinary skill within the art, the assembly 122, by emitting then detecting the pulsed laser light 124, can provide a time-to-travel measurement from which the location of the piston 12 within the bowl 10 can be determined. In one embodiment, a reflective surface or member associated with the piston 12, and, preferably, optically aligned with the laser sensor assembly 122 such as via an optical path within the hub 60 of the bowl 10, can reflect the laser light back to the assembly 122. Moreover, such a time-to-travel measurement can also provide an operator with input regarding the axial distance that the piston 12 has traveled. The laser sensor assembly 122 in FIG. 3 can be used to monitor the piston 12 within the bowl as the piston travels axially upward or downward as, for example, a function of pressure employed to move the piston 12 within the bowl 10. The invention also contemplates using other such conventional assemblies or devices based on, for example, ultrasonic, infrared or radiation energy emitting means to monitor the movement of the piston 12.

Figure 4:
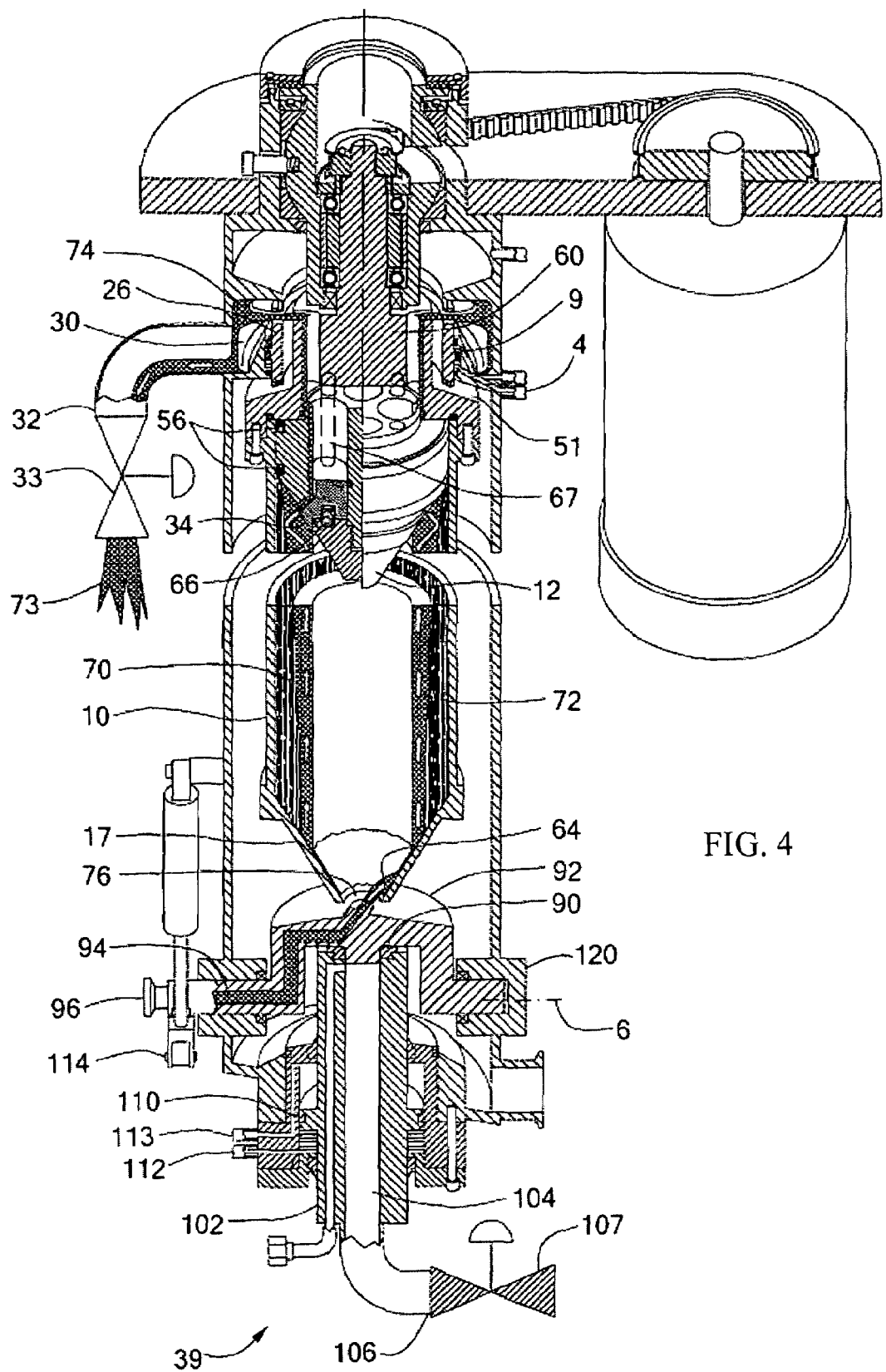
FIG. 4 is a section view of the separator in FIG. 1 illustrating operation in a feed mode.

FIG. 4 illustrates a separator of the invention operating during the feed mode in which the bowl 10 and the piston 12 are rotating together at high speed. For example, the solids-bearing feed liquid is injected into the bowl and flows in a path 64 up the inner surface of the conical lower end 17 of the bowl. Preferably, the piston 12 is held at its uppermost position by hydraulic pressure from the clarified liquid 72 such that it is urged against the hub 60 of the bowl, maintaining the centrate valve 34 in the open position. In one embodiment, the centrate valve 34 is urged open by pins 67 extending from the hub 60 and into the piston 12 to push the valve 34 downward along the vertical axis 41. The centrate valve 34 can close during the solids discharge mode as, for example, springs 66 are urged upward, which is described in greater detail below.

The centrate valve 34 and piston 12 can, for example, also include one or more seals. Preferably, one or more seals can be employed with the centrate valve to prevent clarified liquid from returning to the interior of the separator bowl 10 after exiting therefrom. Such seals can also be used so as to prevent solids from entering the centrate case 30 during the downward movement of the piston 12 in the solids discharge mode. Moreover, such seals can allow a portion of the separator bowl 10 above the piston 12 to become and remain pressurized such that the piston can be efficiently urged downward by fluid pressure during the solids discharge mode. Seals associated with the centrate valve 34 and piston 12 may also prevent clarified liquid from flowing between the interior surface of the bowl 10 and piston 12. The invention also contemplates employing one or more seals in association with any one of or all of the passages, valves, pistons, actuators, assemblies, ports, members and the like described herein.

Exemplary seals of the centrate valve 34 and piston 12 can comprise components such as, for example, PTFE or TEFLON-based (E. I. du Pont de Nemours and Company, 1007 Market Street, Wilmington, Del. 19898) elastomeric materials. For example, such seals are described in greater detail below with reference to the separator shown in FIG. 10. As shown in FIG. 4, the piston 12 can also be held substantially in its uppermost position by frictional forces between piston seals 56 adjacent the inner wall of the bowl 10. Preferably, these seals 56 are disposed about the piston 12 and interface with the inner wall of the bowl 10. In one embodiment, the seals 56 can be separated from each other by a linear portion on the piston 12. The seals 56 can, for example, prevent misalignment of the piston during its axial movement and provide for uniform communication with the interior surface of the bowl such that the bowl may be efficiently pressurized either above or below the piston 12. In another embodiment, the piston 12 can feature a plurality of seals disposed thereabout and interfaced with the inner wall of the bowl 10. Moreover, in lieu of the seals 56, a single seal 59 such as, for example, shown in FIG. 2 can be disposed about the piston 12.

In one embodiment, the interior of the bowl 10 of a separator of the invention can feature a scratch resistant type coating. For example, such a coating can be disposed along a portion or the entire interior surface of the bowl 10. Exemplary coatings for the interior of a separator bowl can include hard chromium, boron-nitride, titanium or combinations thereof. Preferably, a scratch resistant type coating can prevent abrasions to the bowl. Such abrasions can lead to the feed liquid shearing, which may hinder efficient solids separation and recovery. A scratch resistant type coating within the bowl can also provide for uniform communication between the interior surface thereof and one or more seals disposed about the piston 12. Uniform communication between the interior surface of the bowl and one or more seals disposed about the piston 12 can aid in the efficient pressurization of the bowl such as described above and in the efficient recovery of accumulated solids.

Under the separation forces generated by high speed rotation of the bowl 10, FIG. 4 shows the feed liquid separated into accumulated solids 70 and clarified liquid 72. The clarified liquid 72 continues upward along the path 64, through the centrate valve 34 and exits the bowl at the centrate discharge aperture 74. In one embodiment, the centrate discharge aperture 74 can be disposed at or substantially at an upper end of the separator bowl 10. Preferably, the discharge aperture 74 leads into the centrate case 30 that can feature the isolation valve 26, which is, for example, open during the feed mode of operation. The isolation valve 26 can be maintained open by fluid such as compressed gas or hydraulic liquid acting against an annular member 9 disposed about the valve 26.

For example, in the feed mode, fluid can be introduced to a lower surface of the annular member 9 through a lower port 4. The clarified liquid 72 can then pass from the centrate case 30 into the centrate outlet port 32, which features the centrate outlet port valve 33. Preferably, the centrate outlet port valve 33 is open during the feed mode to allow the clarified liquid 72 to exit the separator as centrate 73.

A separator of the invention can also be employed in applications in which there is a need to preserve the quality of the centrate 73 that exits therefrom. For example, a sensitive organic polymer that exits the separator as centrate may be the only desired yield from a given separation. Indeed, the invention also contemplates an application in which both the centrate and solids are desired yields. In an application in which it is important to preserve the quality of centrate exiting the separator, the separator of the invention can be used to reduce overall shearing of clarified liquid and centrate resulting therefrom. Typically, such shearing can, for example, degrade the quality of sensitive centrate.

In one embodiment, a separator of the invention can employ, for example, a separation and/or solids recovery means in addition to or in lieu of a rotating bowl. One example of a separation means is a conventional pairing-disc assembly. A separator of the invention can comprise a pairing-disc assembly to, for example, reduce the overall shearing of clarified liquid and centrate resulting therefrom. For example, a pairing-disc assembly can be used in an application for a separator of the invention in which it is desired to preserve the quality of the centrate. As will be appreciated by those of ordinary skill within the art, a pairing-disc assembly can perform generally continuous separation of solids from feed liquid with minimal overall shearing of, for example, desired centrate.

A separator of the invention can also comprise one or more features such as, for example, fastening and mounting means, by which the bowl 10 can be decoupled from the separator housing 13. Preferably, with the bowl 10 decoupled, the piston 12 and its associated assemblies can be substituted with a separation and/or solids recovery means such as the pairing-disc assembly described above. A separator bowl suitable for use with the substituting separation and/or solids recovery means could subsequently be coupled to the separator of the invention via one or more features. The separator of the invention is then able to be used for a specific application. The ability to modify the configuration of a separator of the invention for a given solids separation application permits use of such separation and/or solids recovery means as an axial scraper or a piston-extrusion assembly described by U.S. Pat. No. 6,776,752, which is hereby incorporated by reference herein.

As shown in the separator of FIG. 4, in the feed mode of operation, the solids divert valve 90 can be held upwardly against a lower surface of the residual divert valve 92 in gas-tight agreement. In one embodiment, the solids divert valve 90 can feature one or more seals such as, for example, disposed thereon. For example, such seals can be used to enable pressurization of the separator housing 13 and bowl 10, preferably, above the upper portion of the piston 12 to provide for movement of the piston 12. Such seals can comprise components such as, for example, PTFE or TEFLON-based (E. I. du Pont de Nemours and Company, 1007 Market Street, Wilmington, Del. 19898) elastomeric materials. With such seals enabling pressurization of the separator housing 13 and the bowl 10, preferably, above the upper portion of the piston 12, the isolation valve 26 can remain open during, for example, the solids discharge mode. A configuration in which the isolation valve 26 of the separator in FIG. 4 remains open during, for example, the solids discharge mode of operation can be advantageous for a particular application.

Preferably, the separator shown in FIG. 4 features the solids divert valve 90 with one or more seals. Such seals can provide for efficient pressurization of the separator bowl 10, preferably, above the upper portion of the piston 12 when, for example, the isolation valve 26 is in a closed position such as during the solids discharge mode. For example, by having the isolation valve 26 closed during a solids discharge mode of operation, the volume pressurized to move the piston within the bowl and the time required for pressurization can be reduced. The separator of the invention as described above with reference to FIG. 2 preferably features the isolation valve 26 in the closed position when it is desirous to pressurize the separator bowl 10, for example, above the upper portion of the piston 12 in order to axially move the piston such as during the solids discharge mode of operation. With the isolation valve closed, the volume between the housing 13 and the bowl 10 need not be pressurized, and the housing also need not be constructed so as to be capable of maintaining such pressurization.

Seals comprising components such as, for example, PTFE or TEFLON-based (E. I. du Pont de Nemours and Company, 1007 Market Street, Wilmington, Del. 19898) elastomeric materials can also, for example, be disposed on or associated with the residual divert valve 92 to, preferably, seal the interface between the valve 92 and the solids divert valve 90. In one embodiment, the solids divert valve 90 can be urged upward by the solids divert piston 102 on which the valve 90 is disposed at an uppermost end in communication with the solids passage 104 of the piston 102. As shown in FIG. 4, pneumatic or hydraulic pressure introduced at an actuator port 112 acts against a lower surface of an annular flange 110 disposed about the solids divert piston to urge the piston 102 upward.

The solids divert piston 102 moves axially upward and downward in response to pneumatic or hydraulic pressure. The axial movement of the divert piston 102 may also be controlled by compressed gas or hydraulic fluid introduced through a control port 113. The control port 113 is provided in the lower end region 39 of the separator such that compressed gas or hydraulic fluid enters the port 113 and contacts an upper surface of the annular flange 110 disposed about the solids divert piston 102. The control 113 and actuator port 112 can also act in concert to actuate and move the divert piston by concomitantly contacting the upper and lower surfaces of the annular flange 110 with compressed gas or hydraulic fluid.

Also shown in FIG. 4 is the residual divert valve 92 in a closed position located at the opening 76 in the bottom of the bowl 10. The valve 92 defines the feed liquid passage 94 in communication with the feed liquid port 96 such that the feed liquid can be injected into the bowl 10 along the path 64. The feed liquid is injected into the bowl 10 across a gap such that the residual divert valve 92 need not contact the bowl 10 as it rotates, preventing mechanical wear of the valve 92 and the bowl 10. Operatively coupled to the valve 92 is a residual divert valve actuator 114. The actuator 114, which can be a pneumatic or hydraulic cylinder, rotates the residual divert valve 92 from its closed position about axis 6. While feed liquid is fed through the feed liquid passage 94 and into the bottom of the bowl 10, the solids outlet port 106 of the solids divert piston 102 features the solids outlet port valve 107 in a closed position.

Figure 5:
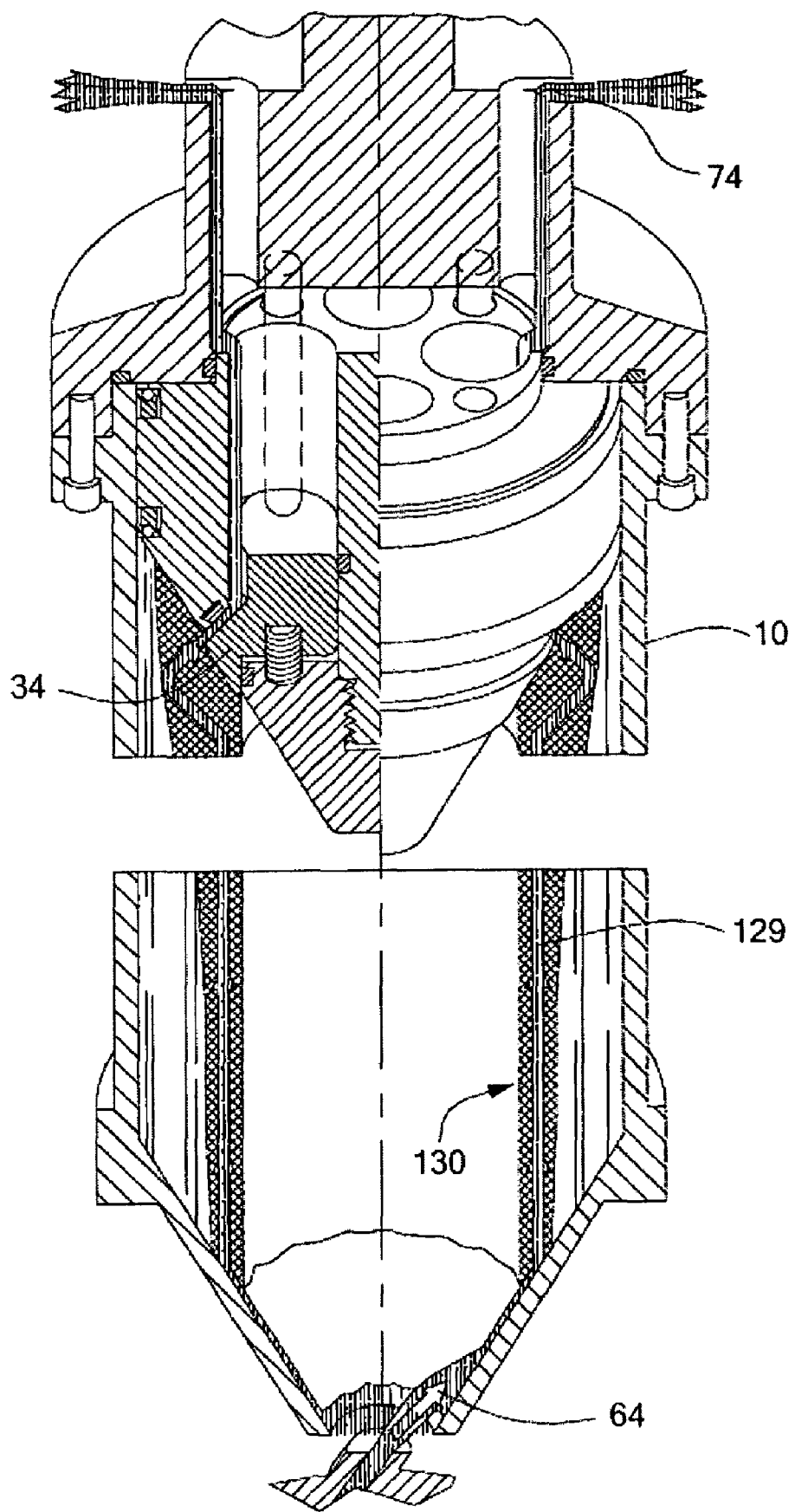
FIG. 5 is a detailed section view including the piston and bowl of the separator in FIG. 1 illustrating operation in the feed mode.

In one embodiment, a separator of the invention can reduce the extent of overall shearing of the clarified liquid 72 as it passes upward along path 64, through the centrate valve 34 and exits the bowl 10 at the centrate discharge aperture 74. For example, the extent of overall shearing of the clarified liquid 72 can be reduced by the movement of the clarified liquid 72 such as shown in FIG. 5. FIG. 5 shows that a separator of the invention and, in particular, the centrate valve 34 can, by design, cause an underflow effect of the clarified liquid along underflow path 129.

The underflow path shown in FIG. 5 is submerged below the external boundary 130 of the clarified liquid 72 by the configuration and/or arrangement of, for example, the bowl 10 and centrate valve 34 during the feed mode. Preferably, by having the underflow path 130 submerged beneath the external boundary 130, air currents, surface waves, any non-concentric effects of the bowl 10 and so forth generally tend not to disturb the movement of the clarified liquid. For example, by not disturbing the movement of the clarified liquid, the extent of overall shearing thereof can be minimized using a separator of the invention.

As shown in FIG. 5, the underflow path 129 also tends to avoid contact with the solids 70 accumulated along the interior surface of the bowl 10, thereby avoiding any shearing of the clarified liquid that could result from such contact. Generally, in a conventional separator, the flow of clarified liquid is along a surface boundary such as, for example, the boundary at the accumulated solids or at the surface interior to the separator bowl. In particular, coriolis acceleration effects within a conventional separator tend to cause clarified liquid to flow along the surface boundary at the interior of the bowl, exposing the liquid to any potential shearing forces in the bowl. The underflow path 129 of clarified liquid 72 in a separator of the invention avoids any such surface boundaries so as to limit the extent of overall shearing.

Figure 6:
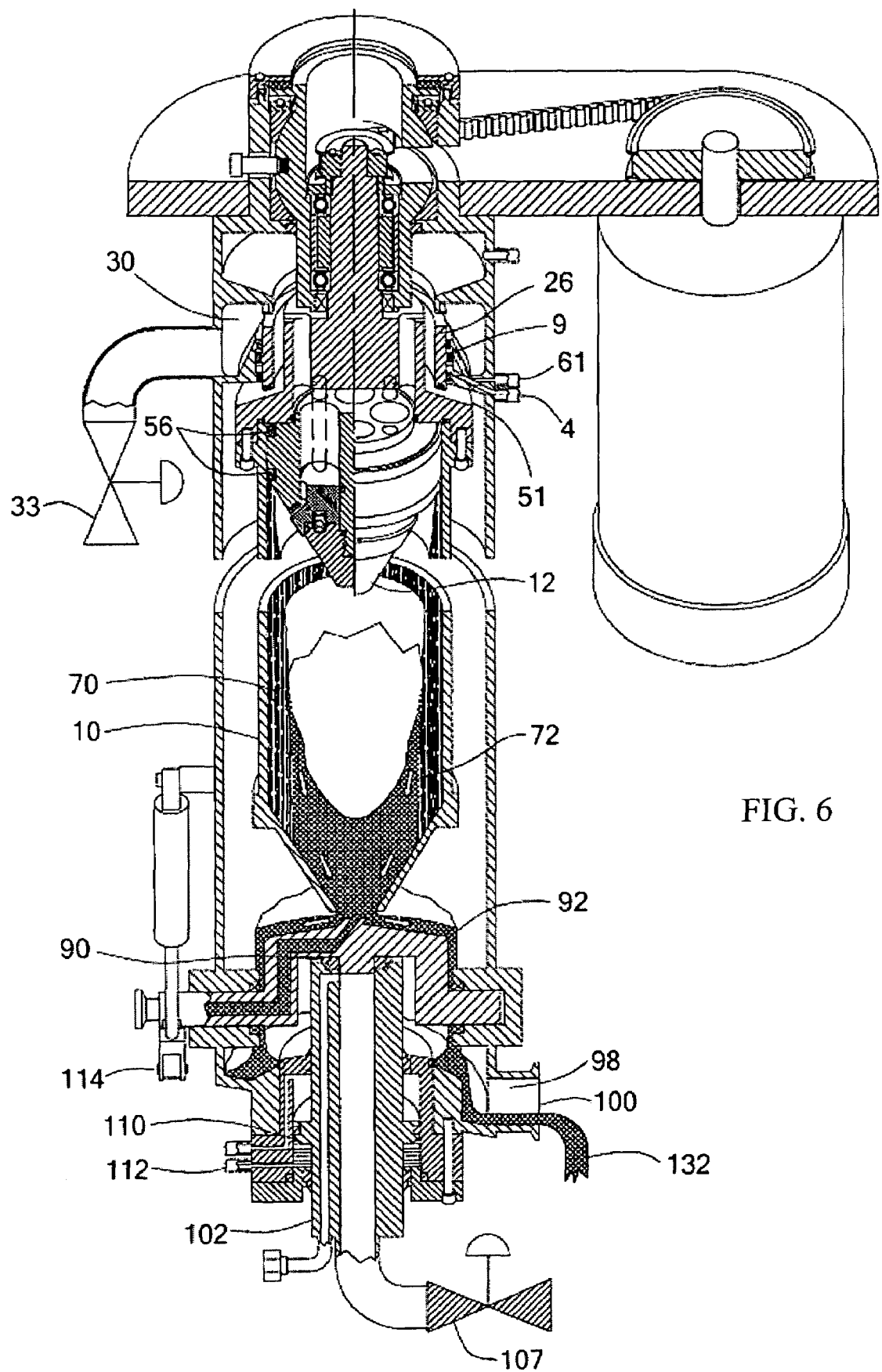
FIG. 6 is a section view of the separator in FIG. 1 illustrating operation when residual liquid drains from the bowl.

FIG. 6 illustrates the separator with the residual divert valve 92 closed to permit the residual liquid 132 to drain out of the bowl 10 and into the residual liquid drain passage 98. The drain passage 98 leads into the residual liquid drain port 100, where the residual liquid 132 eventually drains from the separator. In one embodiment, the residual liquid 132 can also be, for example, provided back to a feed tank associated with the separator. The feed tank can then provide the separator with the residual liquid, for example, in the feed liquid for further solids separation. The liquid 132 is typically drained from the separator by gravity after the feed mode is completed and the high speed rotational separation has been performed. The feed liquid port 96 is also closed or under sufficient back pressure to prevent liquid 132 from exiting the separator through the feed liquid passage 94. Although the bowl 10 and the piston 12 are no longer rotating, accumulated solids 70 remain compressed tightly against the inner surface of the separator bowl 10. The accumulated solids 70 can be recovered from the bowl 10 during the solids discharge mode of operation.

As the residual liquid 132 drains from the bowl 10, the piston 12 is also held substantially in its uppermost position predominately by frictional forces between the piston seal or seals 56 adjacent the inner wall of the bowl 10. In FIG. 6, the separator is also shown with the solids outlet port valve 107 closed and the centrate outlet port valve 33 open. The isolation valve 26 of the centrate case 30 is also maintained open as it was throughout the feed mode of operation. Also shown is the solids divert piston 102 and the annular flange 110 disposed about the piston 102. The lower surface of the annular flange 110 is contacted by fluid such as, for example, compressed gas or hydraulic liquid introduced through actuator port 112 such that the solids divert piston 102 holds the solids divert valve 90 upward in gas-tight agreement with the residual divert valve 92. The agreement between the solids divert valve 90 and the residual divert valve 92 permits residual liquid 132 to drain out of the bowl 10 and into the residual liquid drain passage 98, where the liquid exits the separator.

Figure 7:
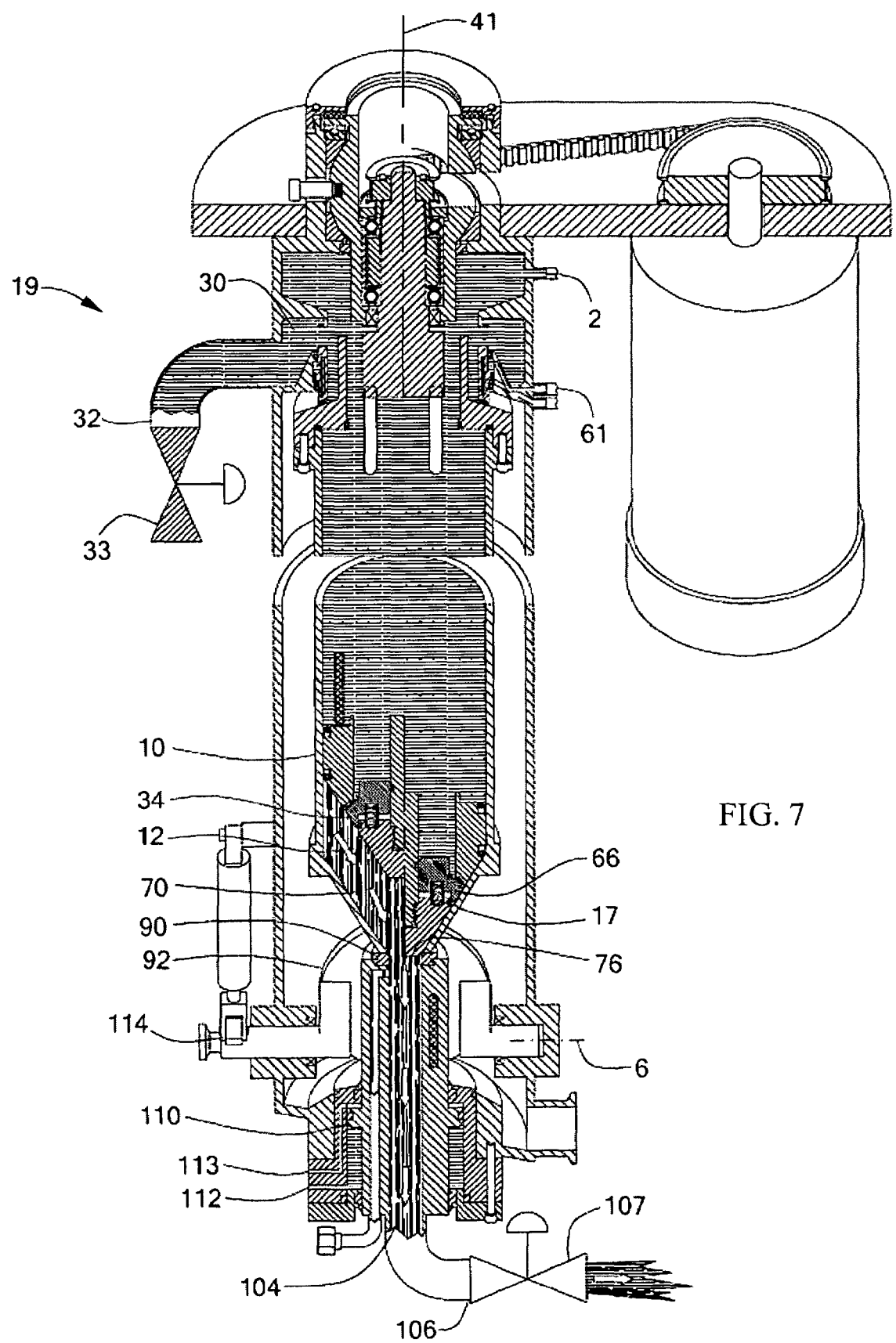
FIG. 7 is a section view of the separator in FIG. 1 illustrating operation in a solids discharge mode.

After the residual liquid 132 has substantially drained from the bowl 10, the separator is prepared for pumping of the accumulated solids 70 in the solids discharge mode. The centrate outlet port valve 33 and the isolation valve 26 are closed prior to solids pumping. As described above, the centrate outlet port valve 33 may be closed manually or via an automatic valve control assembly. The isolation valve 26 is closed by discontinuing fluid introduced through the lower port 4 of the separator. The fluid had acted on a lower surface of the annular member 9 disposed about the isolation valve 26 to maintain it open. For the solids discharge mode, as shown in FIG. 7, fluid such as, for example, compressed gas or hydraulic liquid instead contacts an upper surface of the annular member 9 to actuate and close the isolation valve 26. The fluid is introduced through an upper port 61 during solids discharge and contacts the annular member 9 to urge the isolation valve 26 against the flange 51 disposed in the upper portion 19 of the separator.

FIG. 7 illustrates the separator operating in the solids discharge mode of operation. FIG. 7 is split lengthwise to show two separate positions of the piston 12. On the left, the piston is partway through its downward travel, and on the right, the piston is at the lowermost point of its stroke completing the discharge operation, with its lower conical portion resting against the inner surface of the conical lower end 17 of the bowl 10. As shown, the piston is urged downward along the vertical axis 41 by, for example, fluid such as compressed gas or hydraulic liquid acting against the upper portion of the piston 12. Also shown is the centrate valve 34 in a closed position, under the upward urging force of the springs 66. The springs 66 are urged upward by interaction between the accumulated solids 70 and the lower conical portion of the piston 12 during its downward travel. With the piston 12 traveling downward, the accumulated solids 70 are pressed out of the opening 76 at the bottom of the bowl 10.

The lower conical portion of the piston 12 and the inner surface of the conical lower end 17 of the bowl 10 are machined for precise fit to efficiently remove as much of the accumulated solids 70 as possible. The movement of the piston 12 along the vertical axis 41 is primarily caused by fluid introduced through a driving port 2 in the upper portion 19 of the separator. Fluid pressure introduced at the driving port 2 eventually contacts the upper portion of the piston 12, when the centrate case 30 and the section of the bowl 10 above the upper portion of the piston 12 disposed therein are completely sealed and pressurized. The centrate case 30 and the section of the bowl 10 above the upper portion of the piston 12 can be sealed and pressurized when the isolation valve 26 is closed.

Moreover, the isolation valve 26 closes as it is urged downward against the flange 51 by compressed gas or hydraulic fluid introduced through the upper port 61. The compressed gas or hydraulic fluid eventually contacts the upper surface of the annular member 9, which actuates the isolation valve 26. The centrate outlet port valve 33 for the centrate outlet port 32 is also closed manually or by an automatic valve control assembly during solids discharge mode. The isolation valve 26 is described in greater detail below with reference to FIG. 11, which shows the upper portion 19 of the separator during the solids discharge mode.

The solids discharge mode begins in the upper portion 19 of the separator when the piston 12 is urged axially downward. At the separator lower end region 39, the pumping mode begins as the residual divert valve 92 is rotated from its closed position by the residual divert valve actuator 114. The valve actuator 114 rotates the residual divert valve about axis 6 in response to, for example, fluid pressure. After the solids divert piston 90 has been lowered along the vertical axis 41 from contact with the residual divert valve 92, the valve 92 is preferably rotated 90° from its closed position. The solids divert piston 90 is then urged upward along the vertical axis 41 as fluid such as, for example, compressed gas or hydraulic liquid is applied through the actuator port 112 to act on a lower surface of the annular flange 110. Movement of the solids divert piston 102 may also be controlled by fluid pressure introduced through the control port 113, which can act in concert with the actuator port 112. The control port 113 allows fluid to contact the upper surface of the annular flange 110. The solids divert piston 102 is then urged upward when pressure acting against the upper surface of the annular flange 110 is less than that acting against its lower surface.

As shown, the solids divert piston 102 is urged axially upward such that the solids divert valve 90 is held in gas-tight communication with the opening 76 at the bottom of the separator bowl 10. The interface of the solids divert valve 90 and the bowl opening 76 can also be sealed by seals disposed therebetween comprising components such as, for example, PTFE or TEFLON-based (E. I. du Pont de Nemours and Company, 1007 Market Street, Wilmington, Del. 19898) elastomeric materials such that any solids pumped from the bowl 10 will not become contaminated by contact with the surrounding environment. A sealed interface also prevents accumulated solids 70 from being lost during recovery.

Accumulated solids 70 pushed through the opening 76 in the bottom of the bowl 10 pass into the solids passage 104 disposed partially within the solids divert piston 102 below the solids divert valve 90. The solids passage 104 extends beyond the lowermost end of the piston 102 leading into the solids outlet port 106. As described above, the solids outlet port valve 107 for outlet port 106 is opened prior to discharge such that the pumped solids can pass through the outlet port and valve 106, 107 to exit the separator. The solids outlet port and valve 106, 107 can also be configured so that the pumped solids may be passed onto another process or a storage vessel without further handling by an operator, which reduces the likelihood of or opportunity for contamination.

Figure 8:
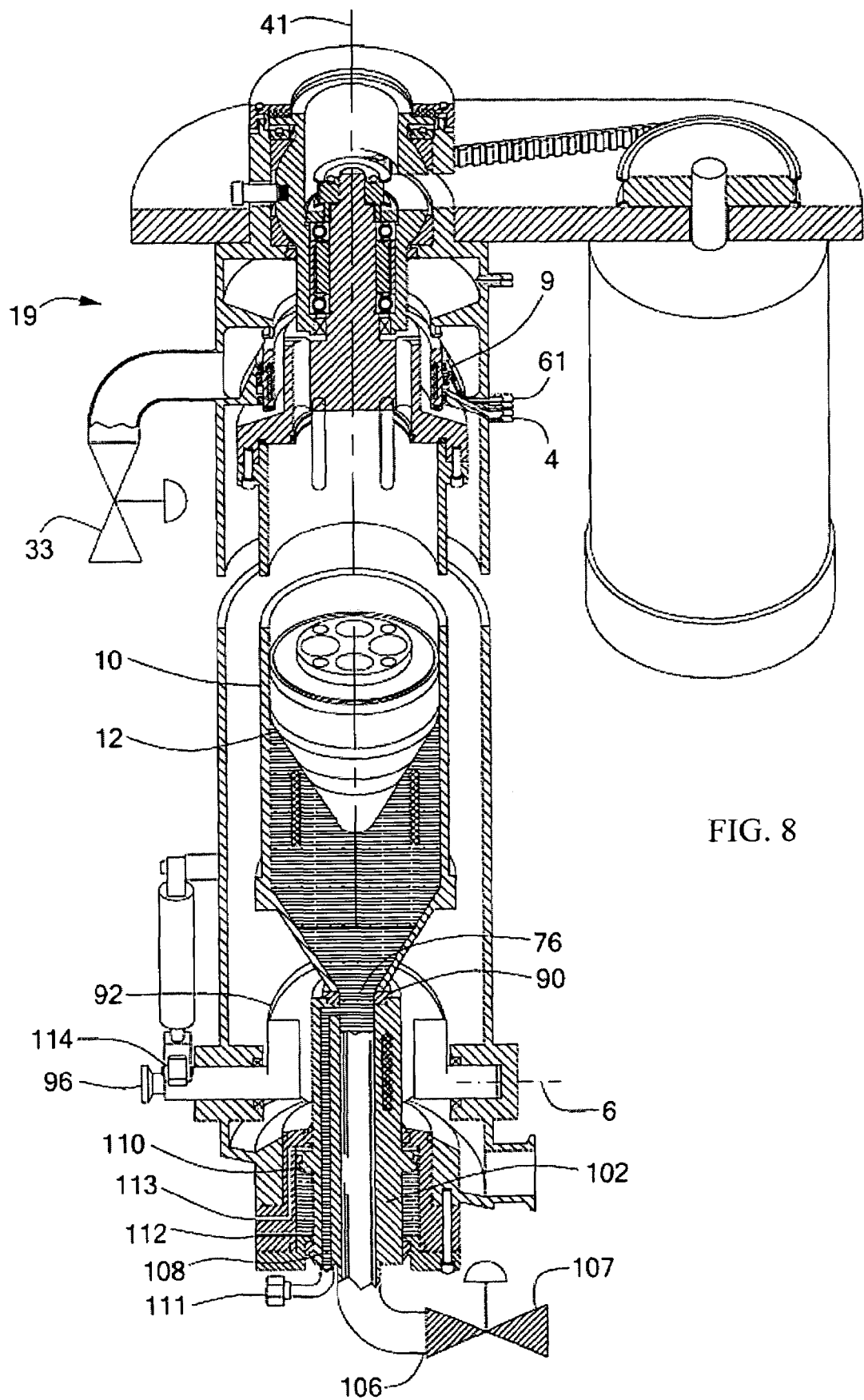
FIG. 8 is a section of the centrifuge in FIG. 1 illustrating operation after the solids discharge mode when the piston is returned substantially to its uppermost position.

Solids discharge is complete when the piston 12 reaches the lowermost point of its downward stroke and rests against the inner surface of the conical lower end 17 for the bowl 10. After the accumulated solids 70 have been discharged from the bowl 10, the piston 12 is returned substantially to its uppermost position by fluid acting against the lower conical portion of the piston 12, as shown in FIG. 8. Fluid such as, for example, compressed gas or hydraulic liquid introduced at the driving port 2 in the upper portion 19 of the separator, which had acted on the upper portion of the piston 12, is discontinued before the piston can be urged upward along the vertical axis 41. Also shown in FIG. 8 is fluid contacting the lower conical portion of the piston 12 after entering the separator through the cleaning passage 108 from the cleaning port 111. When the solids outlet port valve 107 is closed, the fluid introduced at the cleaning port 111 eventually passes through the bowl opening 76 to urge the piston 12 upward. The separator bowl 10 may also be cleaned or sterilized-in-place while the piston 12 is moved upward or after it has substantially reached its uppermost position.

The solids outlet port valve 107 transitions from an open to a closed position after the accumulated solids are substantially pumped from the separator. The outlet port valve 107 remains in a closed position while the piston 12 is urged upward and throughout the next feed cycle of operation. FIG. 8 further shows that before the lower conical portion of the piston 12 is contacted by, for example, compressed gas or hydraulic liquid, the isolation valve 26 for the centrate case 30 and the centrate outlet port valve 33 are opened. Fluid is also no longer introduced through upper port 61 in the upper portion 19 of the separator. Instead, fluid such as, for example, compressed gas or hydraulic liquid enters the separator through the lower port 4 to eventually contact a lower surface of the annular member 9 disposed about the isolation valve 26 so as to open the valve 26. After the upward stroke of the piston 12 is complete, the piston is held substantially at an uppermost position by frictional forces between piston seals 56 adjacent the inner wall of the bowl 10.

The solids divert piston 102 remains in gas-tight communication with the opening 76 at the bottom of the bowl 10 while the piston 12 is urged upward. The gas-tight communication is achieved by fluid pressure introduced through the actuator port 112, which acts against the lower surface of the annular flange 110 disposed about the solids divert piston 102. Although fluid such as, for example, compressed gas or hydraulic liquid may also enter the separator at control port 113, the pressure exerted on the upper surface of the annular flange 110 would be less than that acting against its lower surface to maintain the gas-tight communication. It could also be preferable for the control port 113 to not introduce fluid to the upper surface of the annular flange 110 such that the actuator port 112 would entirely control the movement of the solid divert piston 102.

When the piston 12 substantially reaches its uppermost position, the solids divert valve 90 is drawn downward along the vertical axis 41 in response to movement by the solids divert piston 102 such that the residual divert valve 92 can be rotated to its closed position about the rotational axis 6. The residual divert valve 92 is rotated closed by the residual divert valve actuator 114. The solids divert piston 102 can be lowered by discontinuing or reducing the fluid pressure previously applied at actuator port 112. Movement of the solids divert piston 102 may also be controlled by fluid pressure introduced through the control port 113, which can act in concert with the actuator port 112. The control port 113 allows fluid such as, for example, compressed gas or hydraulic liquid to contact the upper surface of the annular flange 110. The solids divert piston 102 is then urged downward when pressure acting against the upper surface of the annular flange 110 is greater than that acting against its lower surface.

Figure 9:
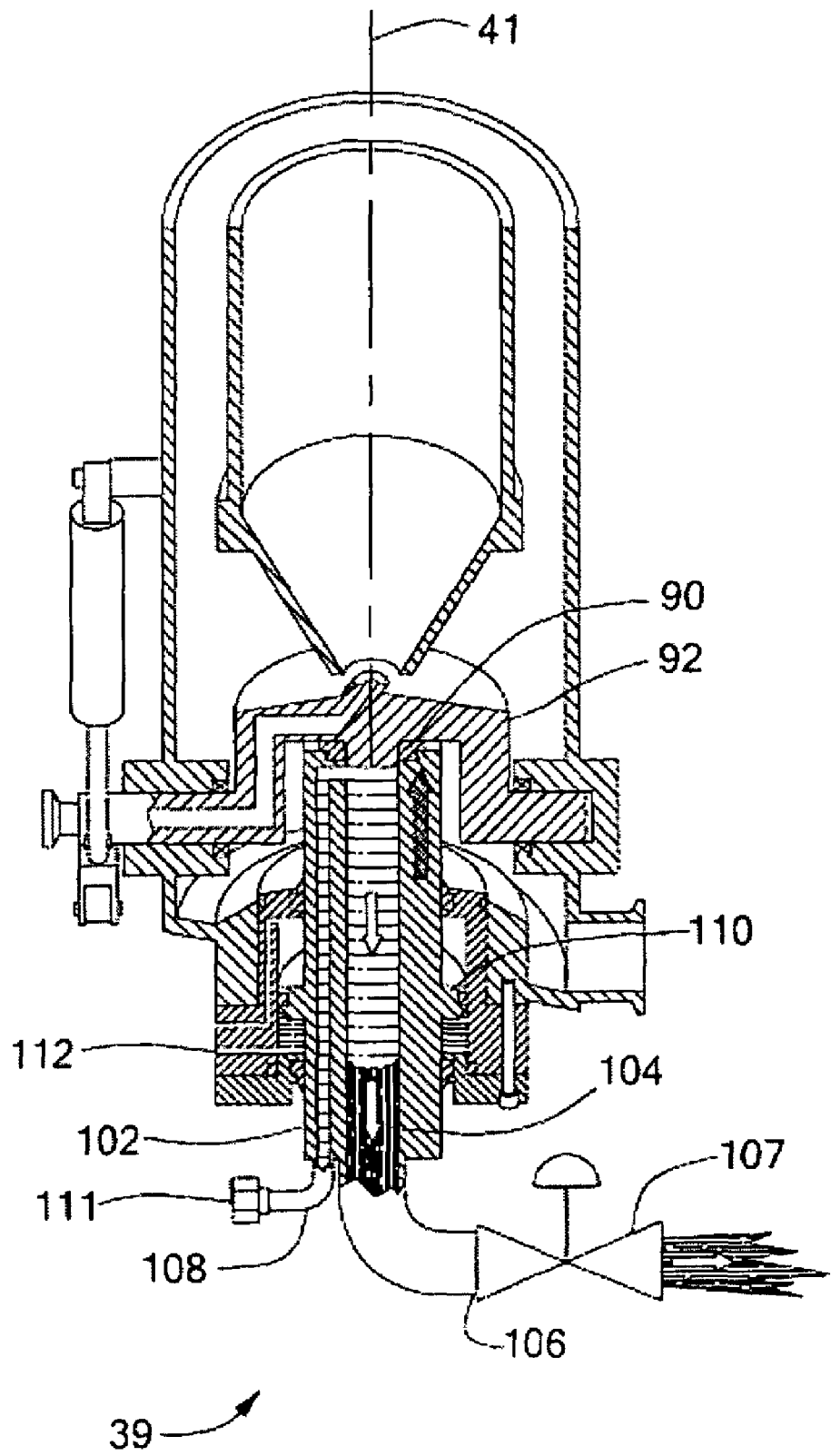
FIG. 9 is a detailed section view of a lower end region of the separator of FIG. 1 when a solids passage is cleaned.

FIG. 9 illustrates the lower end region 39 of the separator in greater detail with the residual divert valve 92 returned to its closed position. Although not shown, the piston has been returned substantially to its uppermost position within the bowl. As described above, the piston can be held in an uppermost position by frictional forces between the piston seals adjacent the inner wall of the bowl. In FIG. 9, the solids divert valve 90 is held upward against the lower surface of the residual divert valve 92 by the solids divert piston 102. As shown, fluid such as, for example, compressed gas or hydraulic liquid introduced at the actuator port 112 acts against a lower surface of the annular flange 110 disposed about the divert piston 102 to urge it upward along a vertical axis 41. Although the solids discharge mode has been completed, solids can remain in the solids passage 104 of the piston 102. To remove the remaining solids, fluid such as, for example, compressed gas or hydraulic liquid is introduced through the cleaning port 111 of the cleaning passage 108, while the solids outlet port valve 107 is open.

The cleaning passage 108 and port 111 extend beyond the lowermost end of the solids divert piston 102, with the cleaning passage partially disposed within the piston 102. The cleaning passage 108 is also in communication at its uppermost end with the solids passage 104 of the piston 102. This communication permits fluid introduced at the cleaning port 111 to pass through the cleaning passage 108 and into the solids passage 104. The fluid pushes the remaining solids in the passage 104 toward the solids outlet port 106, when the solids outlet port valve 107 is open. As described above, when the solids outlet port valve 107 is closed, the cleaning passage 108 and port 108 operate to urge the piston 12 axially upward and return it substantially to an uppermost position for the next feed cycle of operation.

As shown, the solids passage 104 is in communication with the solids outlet port 106 such that any remaining solids in the passage 104 can exit the separator by passing through the solids outlet port valve 107. The solids outlet port 106 may pass the recovered solids onto another process or a storage vessel without further handling such as, for example, by an operator. The cleaning passage 108 and port 111 can also be used to clean or sterilize the solids passage 104 and solids outlet port 106 and valve 107. Such clean-in-place or sterilize-in-place processes are convenient for preparing the centrifugal separator for the next cycle of operation. These processes also increase the solids recovery yield and can reduce the likelihood of or opportunity for contamination.

Figure 10:
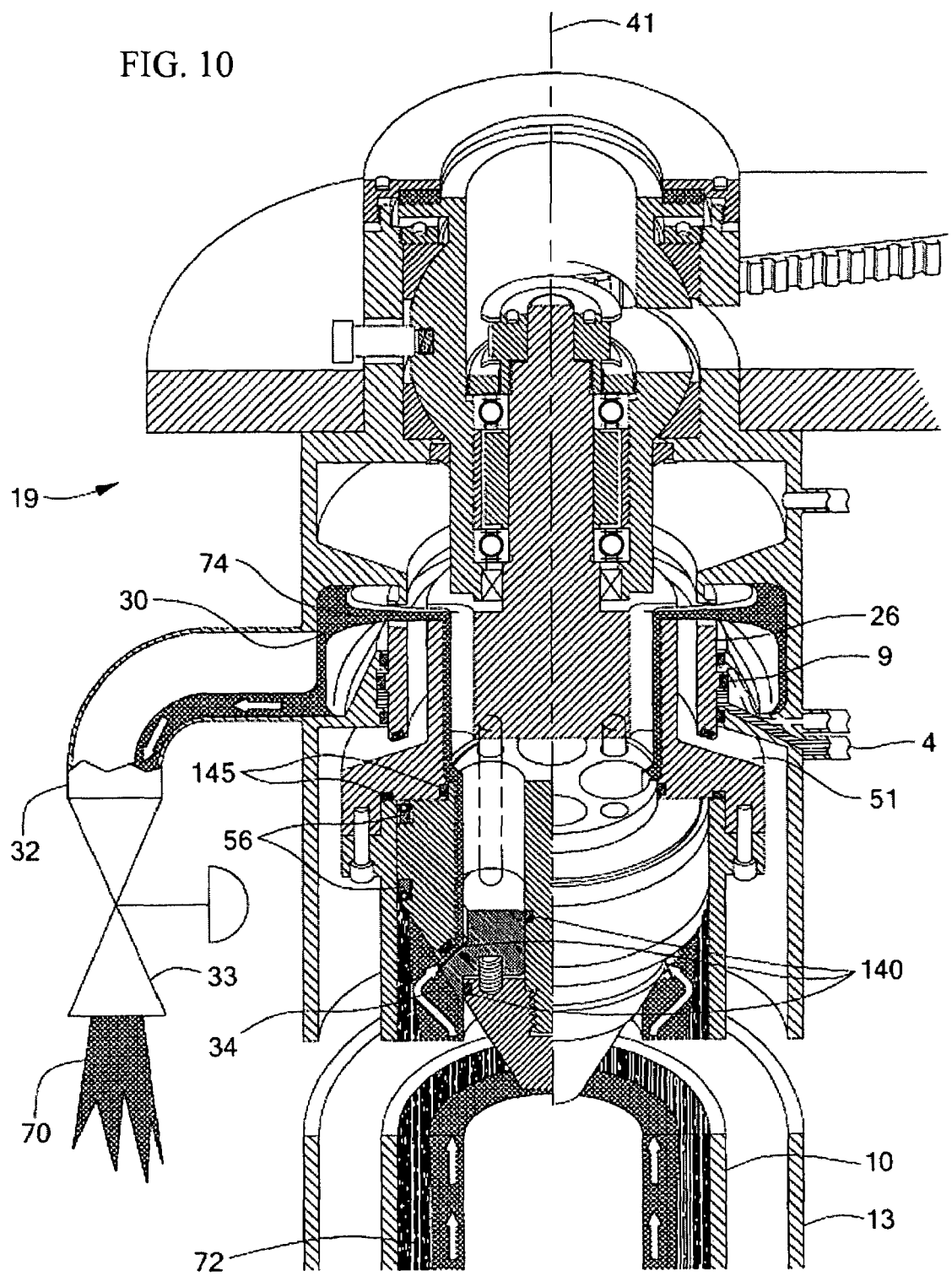
FIG. 10 is a detailed section view of an upper portion of the separator of FIG. 1 in the feed mode.

FIG. 10 illustrates the upper portion 19 of the separator in greater detail during the feed mode of operation with the isolation valve 26 in an open position. In the feed mode, as described above, the piston 12 is held at its uppermost position by fluid pressure from the feed liquid as well as frictional forces between piston seals 56 adjacent the inner wall of the bowl 10. As shown, the isolation valve 26 can be urged open or closed by movement upward or downward, respectively, along the vertical axis 41. The isolation valve 26 is urged upward by, for example, compressed gas or hydraulic liquid acting against the lower surface of the annular member 9 disposed about the valve 26. The compressed gas or hydraulic liquid is provided to the lower surface of the annular member 9 through the lower port 4.

FIG. 10 also shows optional seals 140 for the centrate valve 34 and seals 145 for the piston 12. Preferably, the seals 145 can prevent clarified liquid from flowing between the piston 12 and the interior surface of the separator bowl 10. As described above, seals 140 can be used so as to prevent solids from entering the centrate case 30 during the downward movement of the piston 12 in the solids discharge mode. Seals 145 can allow the bowl 10 above the piston 12 to become and remain pressurized such that the piston can be efficiently urged downward by fluid pressure during the solids discharge mode. The invention also contemplates additional seals that can be used in any one of the embodiments of the invention.

Also shown in FIG. 10 is the isolation valve 26 separated from flange 51 such that the piston 12 and bowl 10 can freely rotate without significant mechanical wear. With the isolation valve in an open position, the centrate 70 is allowed to enter the centrate case 30 by passing through the centrate discharge opening 74. The centrate 70 eventually exits the separator after it passes through the centrate outlet port 32 and the centrate outlet port valve 33, which is also maintained in an open position in the feed mode. The centrate outlet port valve 33 may be opened manually or by an automated valve control.

Figure 11:
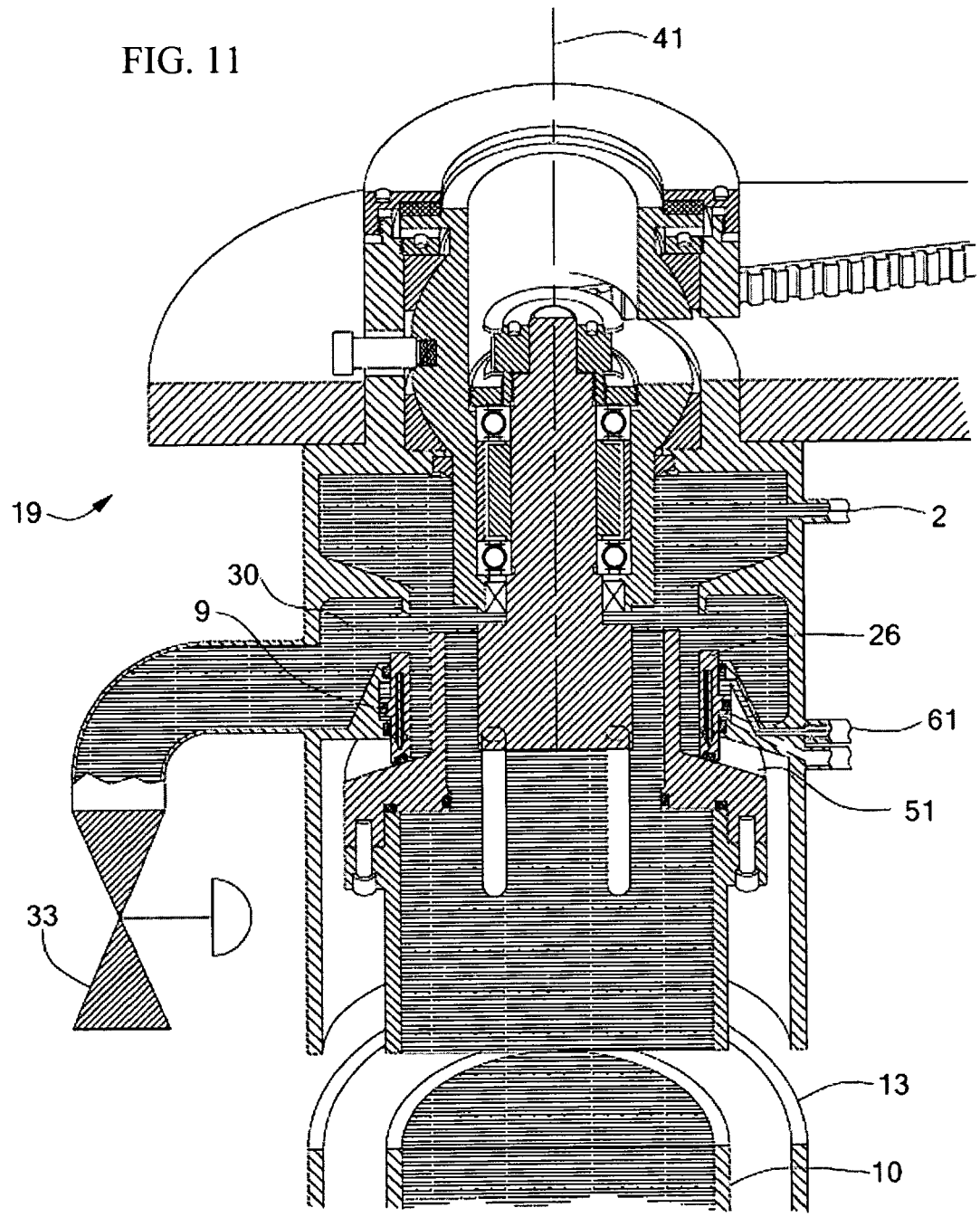
FIG. 11 is a detailed section view of an upper portion of the separator of FIG. 1 in a solids discharge mode.

FIG. 11 illustrates the upper portion 19 of the separator in greater detail during the solids discharge mode of operation. As shown, the isolation valve 26 can be urged open or closed by movement upward or downward, respectively, along the vertical axis 41. The isolation valve 26 is urged downward by fluid such as, for example, compressed gas or hydraulic liquid acting against the upper surface of the annular member 9 disposed about the valve 26. The fluid is provided to the upper surface of the annular member 9 through upper port 61. Prior to the solids discharge mode, fluid introduced to the lower surface of the annular member 9, maintaining the isolation valve 26 open, is preferably discontinued. The bowl 10 and piston 12 are also no longer rotating such that the isolation valve 26 can then rest against the flange 51.

With the isolation valve 26 in contact with the flange 51 and, as described above, the centrate outlet port valve 33 closed, the centrate case 30 and the section of the bowl 10 above the upper portion of the piston 12 disposed therein can be pressurized. Pressurization of the centrate case 30 and the section of the bowl 10 above the upper portion of the piston 12 occurs as fluid such as, for example, compressed gas or hydraulic liquid is introduced to the separator at the driving port 2. The fluid does not exit the centrate case 30 or the bowl 10 due to the gas-tight agreement between the valve 26 and flange 51. A seal made of components such as, for example, PTFE or TEFLON-based (E. I. du Pont de Nemours and Company, 1007 Market Street, Wilmington, Del. 19898) elastomeric materials can also be disposed on the valve 26 to seal its interface with the flange 51. For example, in one embodiment, such as the seal associated with the valve 26 can prevent clarified liquid from passing into the separator housing 13.

As the centrate case 30 and the section of the bowl 10 above the piston 12 pressurizes, the isolation valve 26 is maintained closed against the flange 51. Pressurization of the centrate case 30 and the section of the bowl 10 above the upper portion of the piston 12 eventually provides a greater pressure above the piston 12 than below its lower conical portion. The difference in pressure causes the piston 12 to be urged downward along the vertical axis 41 as fluid contacts the upper portion of the piston. The downward axial movement of the piston 12, as described above and shown in FIG. 7, pushes any accumulated solids 72 along the inner wall of the bowl 10 through an opening 76 in its conical lower end 17.

The following table is presented to more fully characterize and describe the modes of operation for the various embodiments of the invention described above. TABLE I provides, by way of example only, the position or configuration of the isolation valve 26, centrate valve 34, centrate outlet port valve 33, solids outlet port valve 107, solids divert valve 90 and residual divert valve 92 during the feed and the solids discharge mode of operation for the separator of FIG. 1. TABLE I also provides, by way of example only, the position or configuration of each valve of the separator in FIG. 1 when centrate drains from the bowl, the piston is returned substantially to an uppermost position following solids discharge and when the separator of FIG. 1 is cleaned or sterilized-in-place. The valves 26, 34, 33, 107, 90, 92 are each shown in the separator illustrated by FIG. 1. TABLE I is not intended in any way to otherwise limit the scope of the disclosure or any particular embodiment of the invention.

TABLE I

| Mode Of Operation | Isolation Valve | Centrate Valve | Centrate Outlet Port Valve | Solids Outlet Port Valve | Solids Divert Valve | Residual Divert Valve |
|---|---|---|---|---|---|---|
| Feed | Open | Open | Open | Closed | — | Closed |
| Discharge | Closed | Closed | Closed | Open | Upward | Rotated |
| Drain | Open | Open | Open | Closed | — | Closed |
| Piston | Open | — | Open | Closed | Upward | Rotated |
| Clean | — | — | — | Open | — | Closed |

Combined APD Centrifugation and Cross-Flow Microfiltration Systems

When operating as a stand alone system, a cross-flow microfilter continuously concentrates the solids in the retentate flow until the concentration of solids becomes so high that the filter membrane is fouled, and the filtrate flow decreases. With the addition of an APD centrifuge, solids are continuously removed from the retentate flow in a highly concentrated state, and the retentate solids concentration is kept low enough such that the filtrate flow is not reduced.

Figure 12:
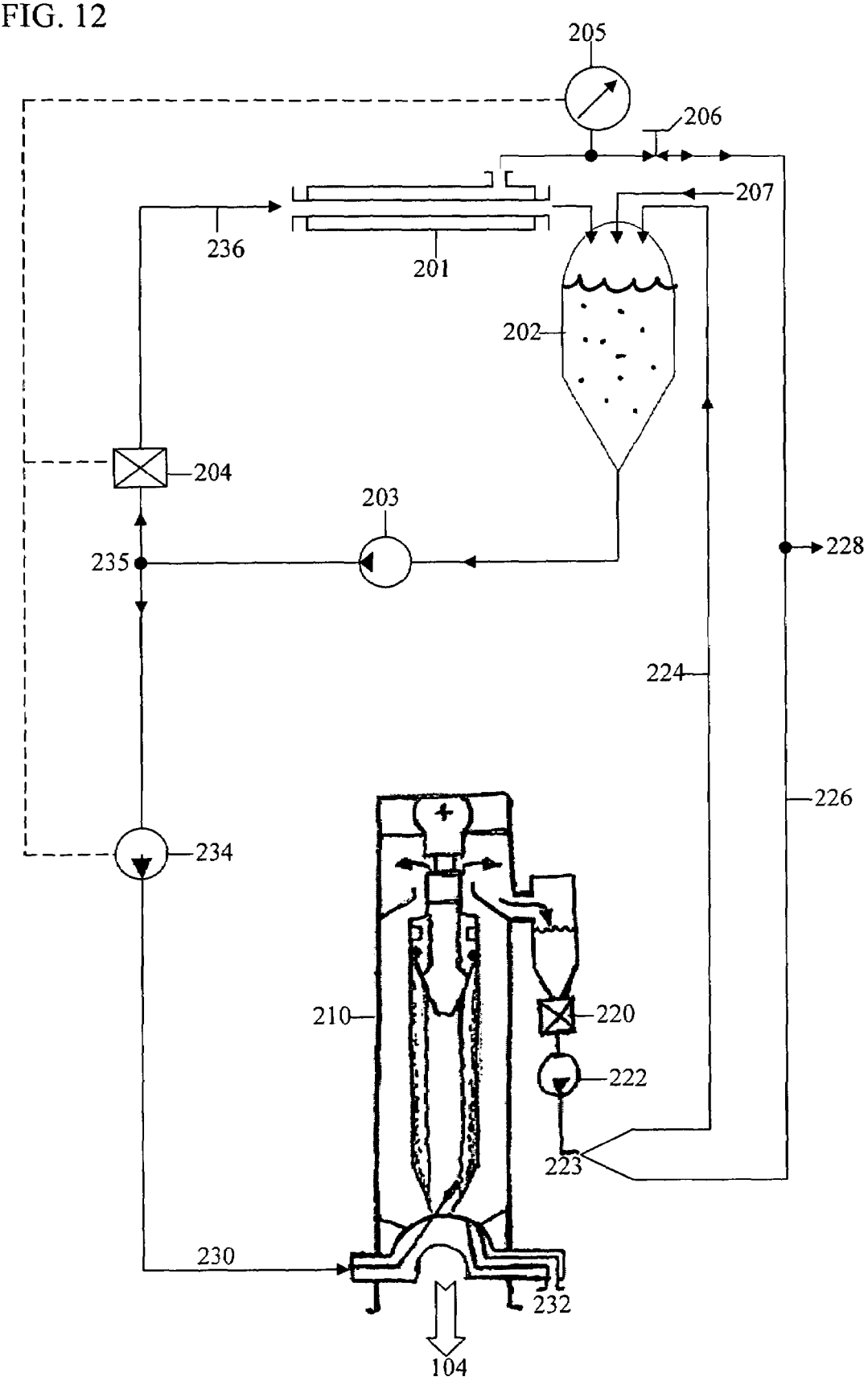
FIG. 12 illustrates an embodiment of a system for combined microfiltration and centrifugation according to the invention.

A schematic of one embodiment of a system for combined microfiltration and APD centrifugation is shown in FIG. 12. A solids-containing suspension 207 is feed into a tank 202 and then pumped 203 to a microporous membrane filter. Solids concentration in the retentate flow can be controlled by direct sensing using a turbidity meter or density meter 204 used to control a retentate pump 203, or can be deduced from the filtrate output pressure 205 or flow. This information can be used, for example, to decide whether to return the retentate 236 to the microfilter 201 or to divert the retentate by means of a valve 235 as feed 230 to an APD centrifuge 210. This information can also be used to control the feed rate through a positive displacement variable speed pump 234, which results in a controlled solids removal. A turbidity or density meter 220 also can be installed on the centrate output of the APD centrifuge 210 to indicate when the APD bowl is full of solids, and signal a need to cause solids discharge 104. The turbidity or density of the centrate also can be used to control a centrate pump 222 and to decide whether to return 224 the centrate to the retentate tank 202 by means of a valve 223 or to discharge 228 the centrate from the system.

There are several advantages of using a system combining APD centrifugation and microfiltration. The microfilter operates under optimal conditions because there is no over-concentration of solids in the retentate line. There is lower solids fouling, and the flux rate across the filter can remain relatively constant. The APD centrifuge can be sized smaller than if no microfiltration is used, because the feed stream is more concentrated. The APD centrifuge will deliver a drier solids discharge than other devices that could be used for solids removal during microfiltration. Thus, both pieces of equipment run optimally, and capital costs are reduced. Continuous solids removal by the APD results in continuous operation of the combined system. Less smearing-up of solids will occur in the retentate flow due to the lower solids concentration in the retentate. Finally, the retentate/feed tank can be smaller by about ten-fold compared to a microfiltration system operated without an APD centrifuge for solids removal.

The APD centrifuge for use in combination with microfiltration is preferably of the type described in pending U.S. patent application Ser. No. 11/218,280, filed Sep. 1, 2005 and entitled GAS DRIVEN SOLIDS DISCHARGE AND PUMPING PISTON FOR A CENTRIFUGAL SEPARATOR. Other centrifuge systems may also be employed, including systems described in the following patents and patent applications: U.S. Pat. No. 6,632,166 entitled CENTRIFUGE HAVING AXIALLY MOVABLE SCRAPING ASSEMBLY FOR AUTOMATIC REMOVAL OF SOLIDS; U.S. Pat. No. 6,776,752 entitled AUTOMATIC TUBE-BOWL CENTRIFUGE FOR CENTRIFUGAL SEPARATION OF LIQUIDS AND SOLIDS WITH SOLIDS DISCHARGE USING A SCRAPER OR PISTON; U.S. patent application Ser. No. 10/874,150 entitled CENTRIFUGE FOR SEPARATION OF LIQUIDS AND SOLIDS WITH SOLIDS DISCHARGE USING A PISTON OR SCRAPER; U.S. patent application Ser. No. 10/823,844 entitled CONICAL PISTON SOLIDS DISCHARGE CENTRIFUGAL SEPARATOR; and U.S. patent application Ser. No. 10/973,949 entitled CONICAL PISTON SOLIDS DISCHARGE AND PUMPING CENTRIFUGAL SEPARATOR. All of the foregoing are incorporated herein by reference.

In the '280 application, a cylindrical bowl centrifuge is shown having a one-piece gas driven piston. The piston head is located at the upper end of the cylinder during feed liquid introduction and centrifugal separation. After separation and cessation of bowl rotation, gas pressure is used to translate the piston head down through the bowl, pushing the accumulated solids ahead of it and out of the bowl.

Figure 13:
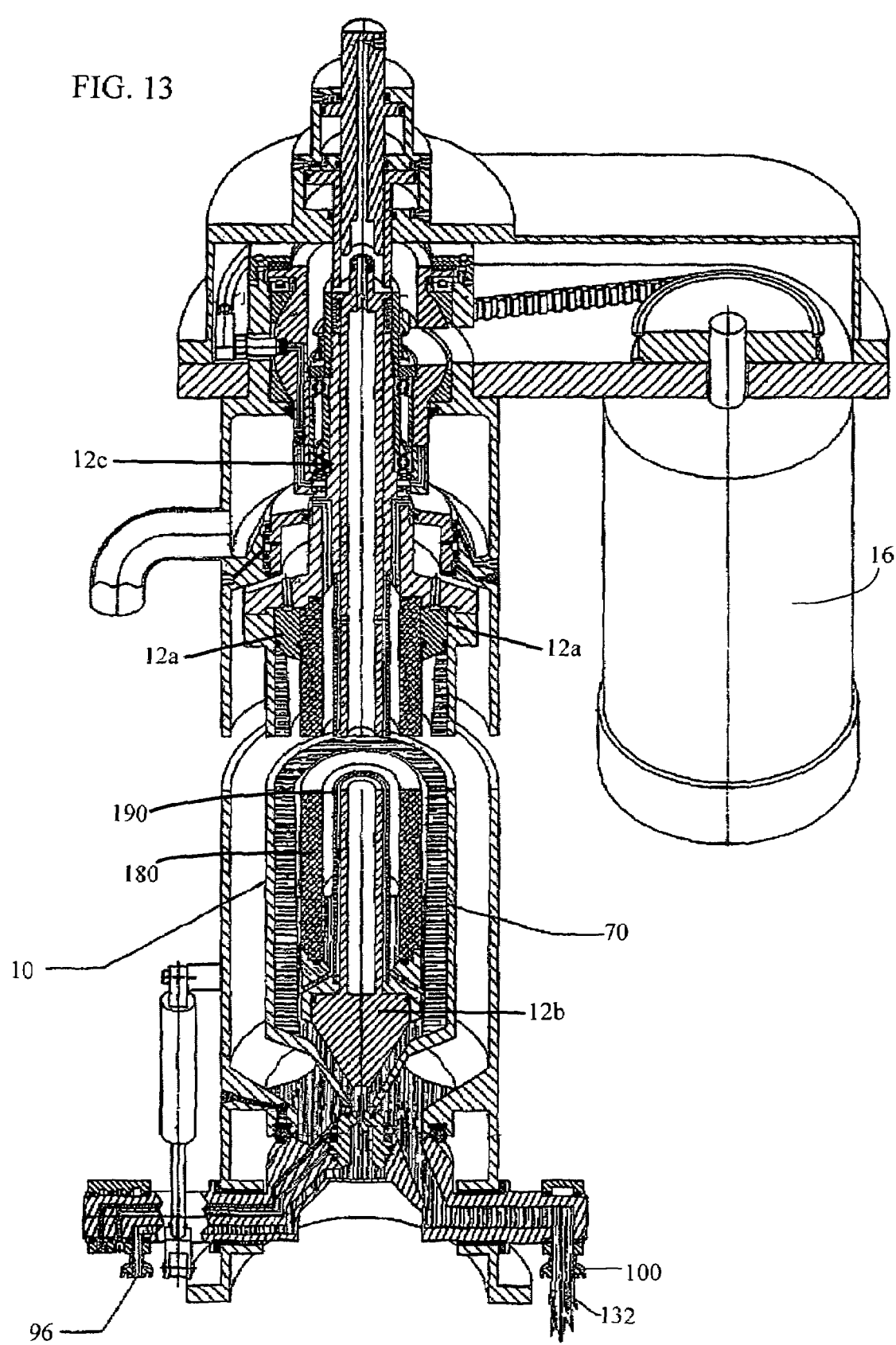
FIG. 13 is a section view of a centrifuge embodiment according to the invention. This embodiment has a peripheral outer piston and an inner piston, as well as a microfiltration membrane and diaphragm.

A system for APD centrifugation and microfiltration can be combined in a single housing. For example, a microfilter can be incorporated into the bowl of an APD centrifuge, such that piston extrusion accommodates the presence of a microfiltration membrane. For this embodiment, the single piston of the '280 application can be replaced with a peripheral outer piston and an inner piston. FIG. 13 depicts an embodiment of an APD centrifuge incorporating a microfilter. The apparatus is shown at the beginning of a solids discharge cycle. The cylindrical bowl 10 slows as the drive motor 16 brakes to a stop. Solids 70 have accumulated on the inner wall of the bowl. The feed port 96 is closed, and residual liquid 132 drains from the bowl through residual liquid port 100. A cylindrical microporous membrane 180 is positioned within the bowl. Within the membrane is a cylindrical rubber diaphragm 190. The outer piston 12a, also referred to as an outer solids discharge piston, is cylindrical and has a lower face with a down and inward slope. The inner piston 12b is disposed at the end of a hollow shaft 12c which extends along the axis of symmetry of the cylindrical bowl. The inner piston is a compound structure comprised of a cylindrical portion and a substantially conical portion. The lower end of the inner piston has a downwardly facing concave depression.

At the upper end of the inner piston shaft, an outwardly projecting circular flange has a lower surface adapted for interfering with a spring disposed about the upper end of the shaft, just below the flange. The shaft upper end is also provided with an upwardly projecting cylindrical member having a circular seal disposed thereabout. The upwardly projecting cylindrical member has a hollow interior in communication with the hollow interior of the shaft. The shaft is adapted for limited vertical translation, as will be discussed below.

Above the vertical shaft is a vertically translatable pressure coupling that is dimensioned to selectively mate, in a fluid-tight relationship, with the upwardly projecting cylindrical member of the shaft. A conduit formed in the coupling mates with that of the cylindrical member once the coupling is driven down against the shaft. A port at an upper end of the coupling enables connection to a source of pressurized gas. A peripheral flange provided on the coupling is disposed within the system housing whereby introduction of pressurized gas above or below the coupling flange drives the coupling down or up, respectively.

About a lower portion of the coupling there is provided an inner piston actuator. Like the coupling, the actuator is provided with a peripheral flange, disposed in a respective housing, having ports for introduction of pressurized gas above or below the actuator flange, thereby driving the actuator down or up, respectively. When driven down, the actuator presses upon an upper end of the shaft, thereby driving the inner piston down towards and ultimately against a lower end of the cylindrical bowl, which is also referred to as a low shear conical feed accelerator. A lower end of the spring, located at the upper end of the shaft, presses against a shoulder portion of the bowl housing, thereby biasing the shaft in an upper position. The lower face of the inner piston and the conical feed accelerator have complimentary shapes, such that solids disposed therebetween are squeezed out a lower exit port when the inner piston is driven downward.

Within the cylindrical bowl, adjacent the shaft, is a tubular rubber diaphragm 190. Upper and lower ends of the diaphragm are affixed to the bowl. Ports formed in the shaft enable pressurized gas introduced at the port in the coupling to inflate the diaphragm, which will be discussed subsequently.

A cylindrical microfiltration membrane 180, e.g., formed of ceramic or sintered metal, is disposed about the rubber diaphragm and affixed at upper and lower ends to the cylindrical bowl. A cylindrical inner air gap exists between the membrane and the diaphragm when the diaphragm is not inflated by pressurized gas.

A cylindrical outer air gap is formed between the outer surface of the membrane and the inner surface of the cylindrical bowl. It is in this outer air gap that the outer piston travels following solids deposition. The lower end of the cylindrical bowl defining the bottom of the outer air gap has the same shape as the inwardly canted lower surface of the outer piston, thereby enabling complete extrusion of solids accumulated in the outer air gap once the outer piston is driven downwards, discussed below.

Plural conduits are formed between the inner and outer air gaps, below the membrane and above the inner piston, to enable draining of residual liquid from the bowl after separation. Similarly, plural conduits are formed between the outer air gap and the area above the low shear conical feed accelerator to enable liquid to pass into the outer air gap during feed liquid introduction, to enable residual liquid to drain out after separation, to enable solids to be forced out of the bowl by the outer piston, and to enable pressurized gas introduced at the lower end of the bowl to drive the outer piston to its upper position.

An upper end of the cylindrical bowl is provided with two sets of circularly arranged conduits. Proximate to and radially outward from the outermost set of conduits is a centrate case isolation valve. This valve has a peripheral flange on either side of which can be created a pressure differential for moving the centrate valve between open and closed positions. Open, in this context, means there is no barrier between the centrate or clarified liquid case above the cylindrical bowl and the air gap between the housing and the cylindrical bowl outer surface. In the closed position, the centrate valve creates a gas-tight barrier between these regions. During bowl rotation, the centrate valve is maintained in the open position to avoid interference between the valve and the bowl. Movement between the open and closed positions is accomplished by selectively introducing pressurized gas into isolation piston control ports formed on the outside of the housing.

Conduits are also formed through the centrate case isolation valve itself. Depending upon bowl orientation, at least one of these conduits is aligned with a solids discharge piston gas supply port formed on the housing exterior surface. When the centrate case isolation valve is closed, pressurized gas applied to the solids discharge piston gas supply port passes through the centrate case isolation valve conduits and the bowl upper end outermost conduits to force the outer piston downward.

The innermost set of conduits formed in the bowl upper end connect the inner air gap between the tubular rubber diaphragm and the microfiltration membrane with the clarified liquid or centrate case. As discussed below, during initial separation, these innermost conduits enable clarified liquid to process up and out of the cylindrical bowl, into the centrate case, and out of the centrate port.

Figure 14:
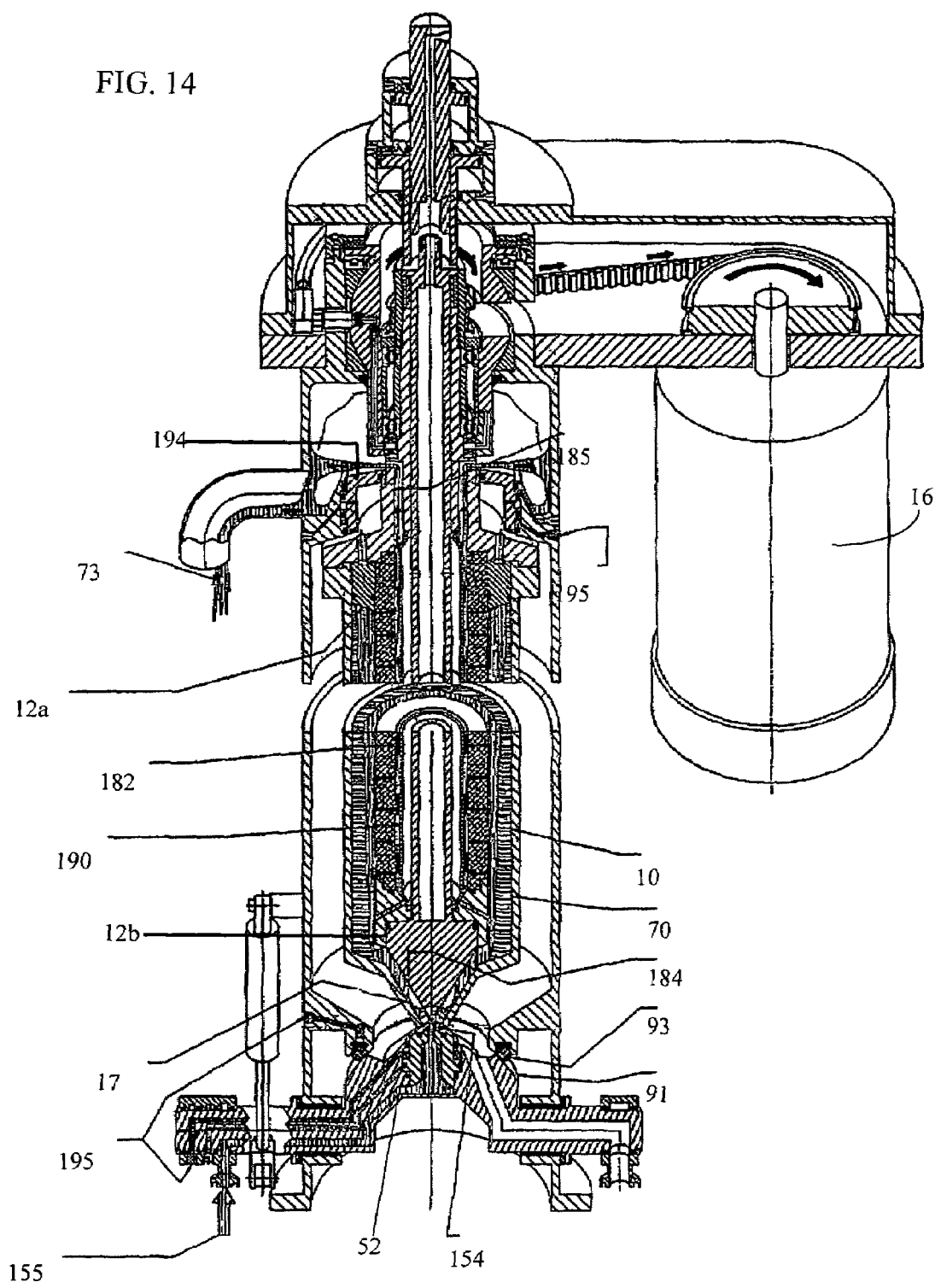
FIG. 14 is a section view of the centrifuge embodiment of FIG. 13 in the feed mode.
Figure 15:
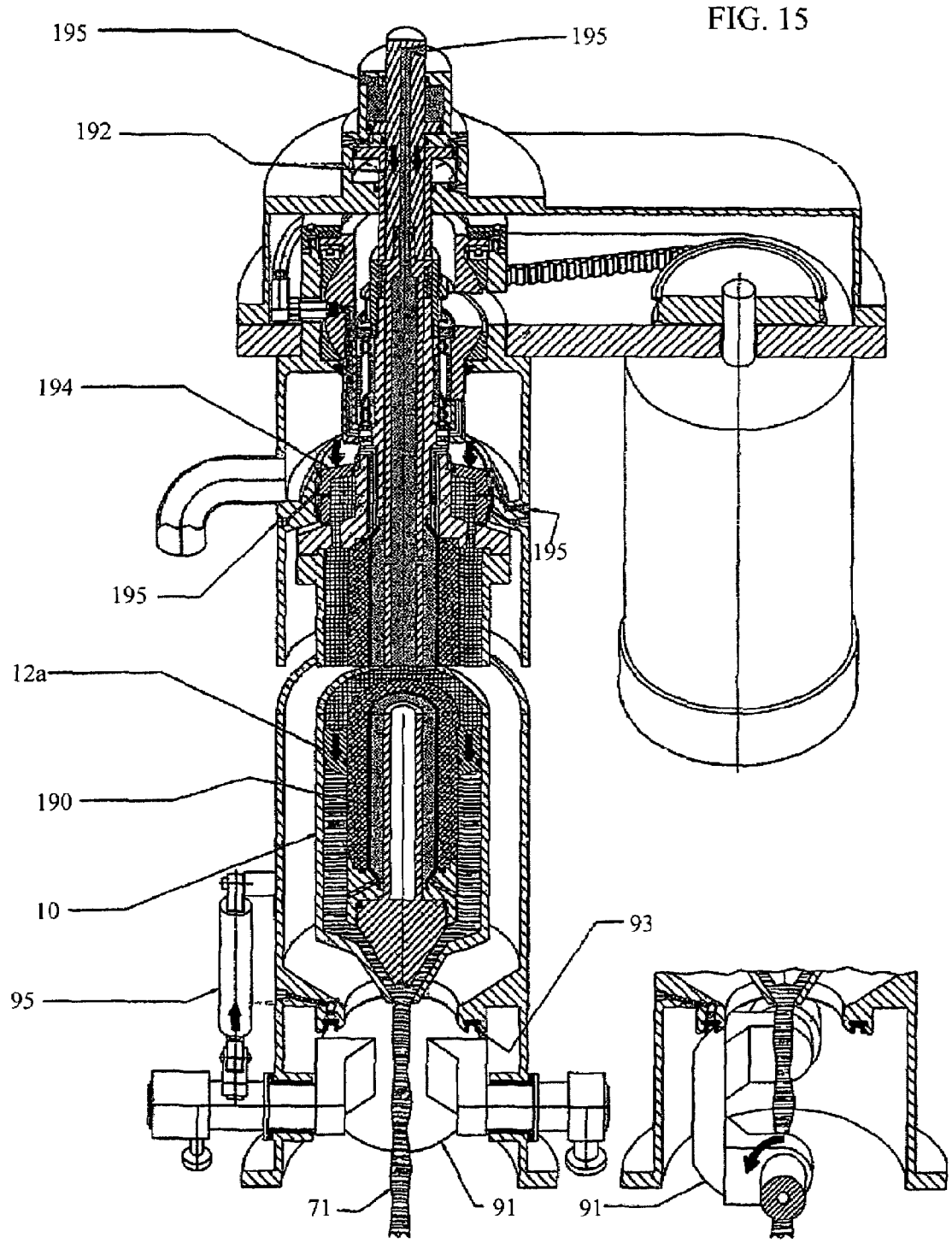
FIG. 15 is a section view of the centrifuge embodiment of FIG. 13 in the discharge mode.
Figure 16:
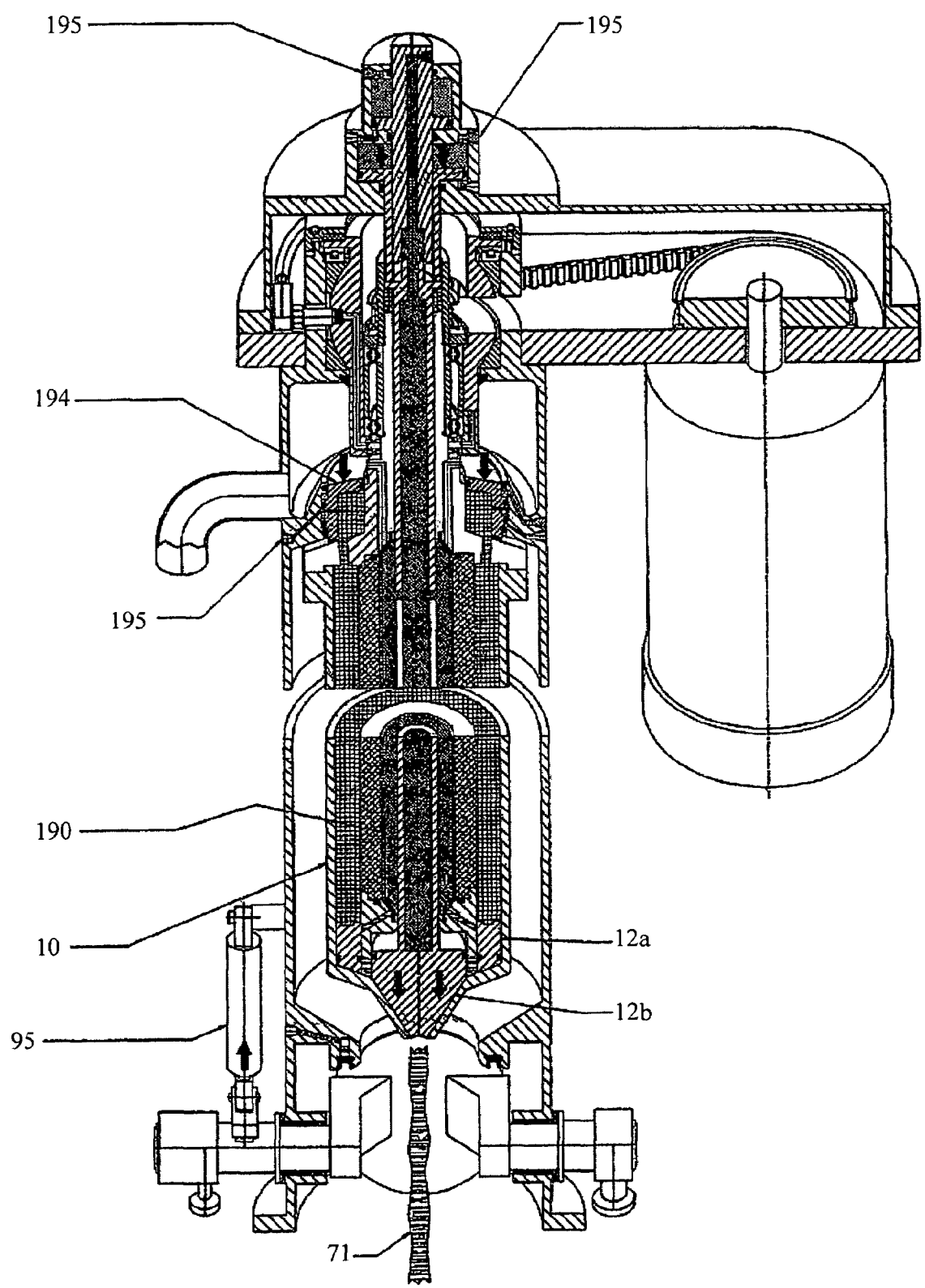
FIG. 16 is a section view of the centrifuge embodiment of FIG. 13 in the discharge mode.
Figure 17:
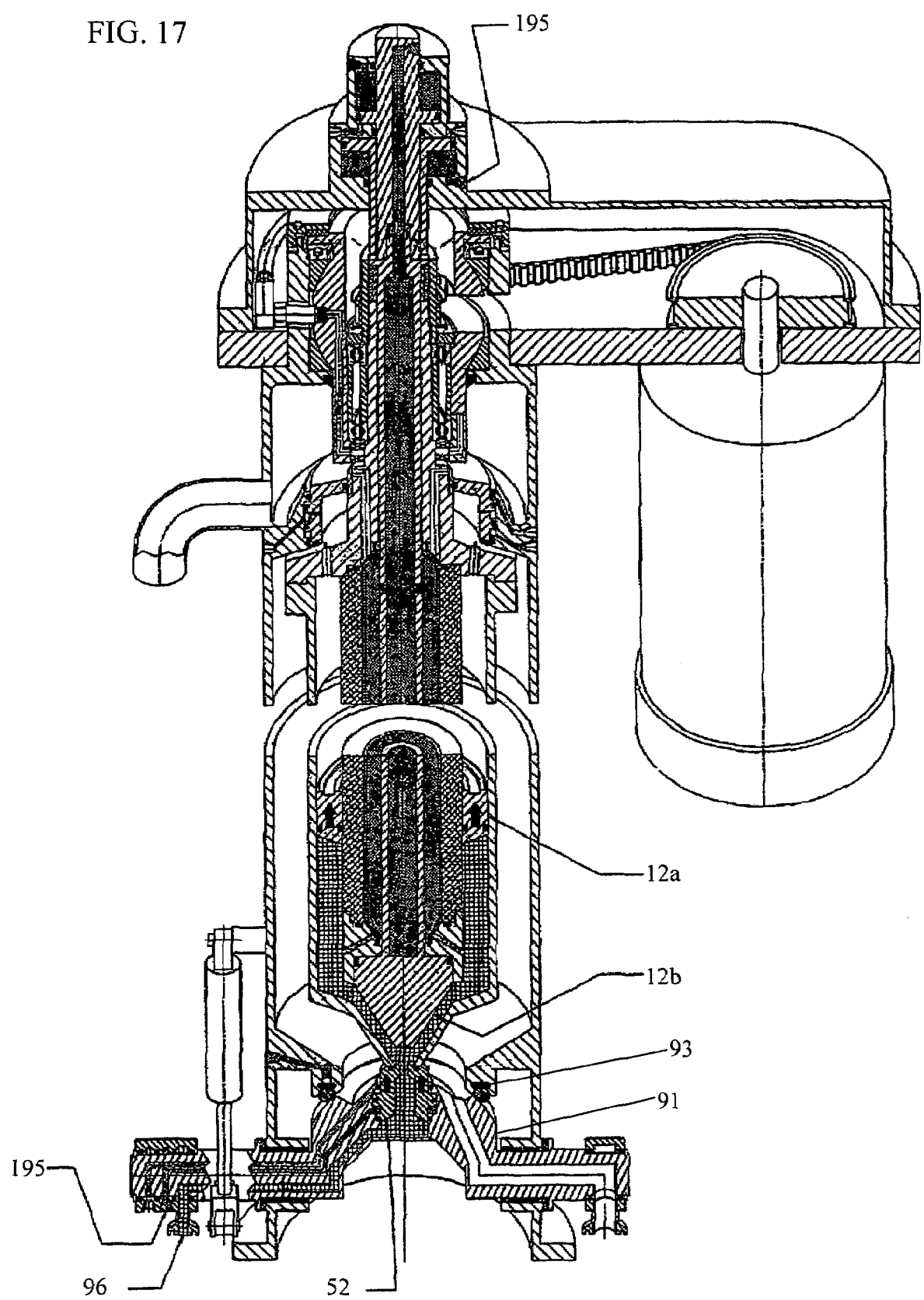
FIG. 17 is a section view of the centrifuge embodiment of FIG. 13 in the retract mode.

At the lower end of the cylindrical bowl, a solids valve 91 is provided. The solids valve has open and closed positions, depending upon its orientation about an axis of rotation which is orthogonal to the axis of rotation of the cylindrical bowl. FIGS. 13-14 and 17 illustrate the solids valve in the closed position, while FIGS. 15-16 illustrate the solids valve rotated 90 degrees about the axis of rotation (away from the viewer) to the open position. A solids valve actuator 95 and associated linkage control the positioning of this valve. The actuator may be pneumatic or hydraulic.

Disposed within the solids valve is a piston having a piston retract actuator 52 which selectively places the solids valve piston in mechanical communication with the bowl lower extent. A peripherally disposed flange enables a differential in gas pressure on opposite sides of the flange to control the piston position. Two air ports formed on the solids valve enable the formation of these pressure differentials. To seal the lower end of the cylindrical bowl housing to the solids valve, a circular, inflatable solids valve seal 93 is provided. A port formed on the housing exterior connects a source of pressurized gas 195 to this seal for selective inflation.

Also formed within the solids valve is a feed liquid conduit. This conduit has a port 155 on the outside the solids valve and terminates below the lower extent of the solids valve piston. The hollow interior of the piston and the concave lower extent of the inner solids discharge piston are shaped to form a feed inlet pool of radius R1, shown in FIG. 14 as 184.

Opposite the piston actuator control paths and the feed liquid conduit in the solids valve is a residual liquid drain (shown in FIG. 13 as 100) which may be connected to waste or to a system for recycling or recovering the drained liquid.

FIG. 14 illustrates the embodiment of FIG. 13 in feed mode. The inner piston 12b is maintained in its upper position due to spring biasing. The outer piston 12a is maintained in its upper position through friction and pressure applied by the introduced feed liquid to be separated. The centrate case isolation piston 194 is raised to its open position, and centrate 73 flows out under gravity. The solids valve 91 is closed and the solids valve seal 93 is inflated. Within the solids valve, the piston retract actuator 52 is driven down away from the lower extent of the bowl. The motor 16 is driven at high speed, thus resulting in rapid rotation of the bowl 10.

Feed liquid 155 introduced through the solids valve 91 forms a jet 154 as it exits the solids valve piston. The jet strikes the concave lower surface of the inner piston and forms an inlet pool of radius R1 184 against the conical surface 17 of the low shear feed accelerator. The feed liquid then passes through conduits to the outer air gap. Solids 70 collect against the bowl inner wall. Filtered centrate 182 passes through the membrane and towards the bowl inner diameter. Air or hydraulic pressure 195 keeps the piston retract actuator 52 down and the solids valve seal inflated 93.

While the tubular rubber diaphragm 190 is forced outward by centrifugal action, the filtered centrate 182 pushes it away from the membrane since the centrate exit port radius R2 185 is greater than the feed pool radius R1 184.

Following the feed mode, a drain mode is initiated. Here, bowl rotation ceases, allowing residual liquid to drain from the inner and outer air gaps, through the bowl lower extent, into the area above the sealed solids valve, and through the residual liquid drain port. Feed liquid pressure is preferably maintained to avoid residual liquid from passing into the solids valve piston and the feed liquid path. Collected solids remain against the bowl outer wall.

Discharge mode is shown in FIGS. 15 and 16. In FIG. 15, air or hydraulic pressure 195 is used to drive the vertically translatable pressure coupling down into gas-tight communication with the cylindrical member atop the inner piston shaft. Pressurized gas 195 is also used to close the centrate case isolation valve. The solids discharge valve seal 93 is deflated, the solids discharge valve piston is retracted, and the solids discharge valve 91 itself is rotated to its open position. Pressurized gas applied to the pressure coupling results in pressurization within the shaft and the inner air gap between the rubber diaphragm and the shaft, forcing the diaphragm 190 into contact with the membrane inner surface. This then seals off the membrane, preventing solids from migrating into the membrane as they are scraped by the outer piston 12a. The latter occurs as pressurized gas is introduced to the outer solids piston pressure supply port on the housing surface. The gas flows through the isolation valve conduits, through the outermost set of conduits formed in the cylindrical bowl upper end, and thereby into the outer air gap above the outer piston. This pressure drives the outer piston down, resulting in accumulated solids being scraped from the membrane outer surface and the cylindrical bowl inner surface, through the conduits connecting the outer air gap and the area below the inner piston, and extruded 71 through an opening in the bowl.

In FIG. 16, all solids beneath the outer piston 12a have been forced either out of the bowl or into the area beneath the inner piston 12b. The diameter of the conduits between the outer air gap and the area beneath the inner piston is minimized to minimize waste. Gas pressure 195 is used to move the inner piston actuator within the vertically translatable pressure coupling. This gas pressure overcomes the spring bias and the resistance of solids accumulated in the area beneath the inner piston. As the inner piston is driven downward, the remaining solids are driven from the bowl. The perimeter of the concave region formed on the lower extent of the inner piston is dimensioned to enable the remaining extruded solids 71 to be cut off from the bowl opening.

As shown in FIG. 17, the solids divert valve 91 is closed, the solids valve seal 93 is inflated, and the solids discharge valve piston 52 is raised after solids discharge. Gas pressure 195 is used to return the inner piston actuator to its upper position, thereby retracting the inner piston 12b. Gas pressure is also introduced to the feed port in the solids divert valve. This also forces the inner piston up, as well as forcing the outer piston 12a up. Gas pressure 195 continues to be applied to the pressure coupling in order to keep the rubber diaphragm inflated against the inner surface of the membrane.

Figures 18, 19, 20:
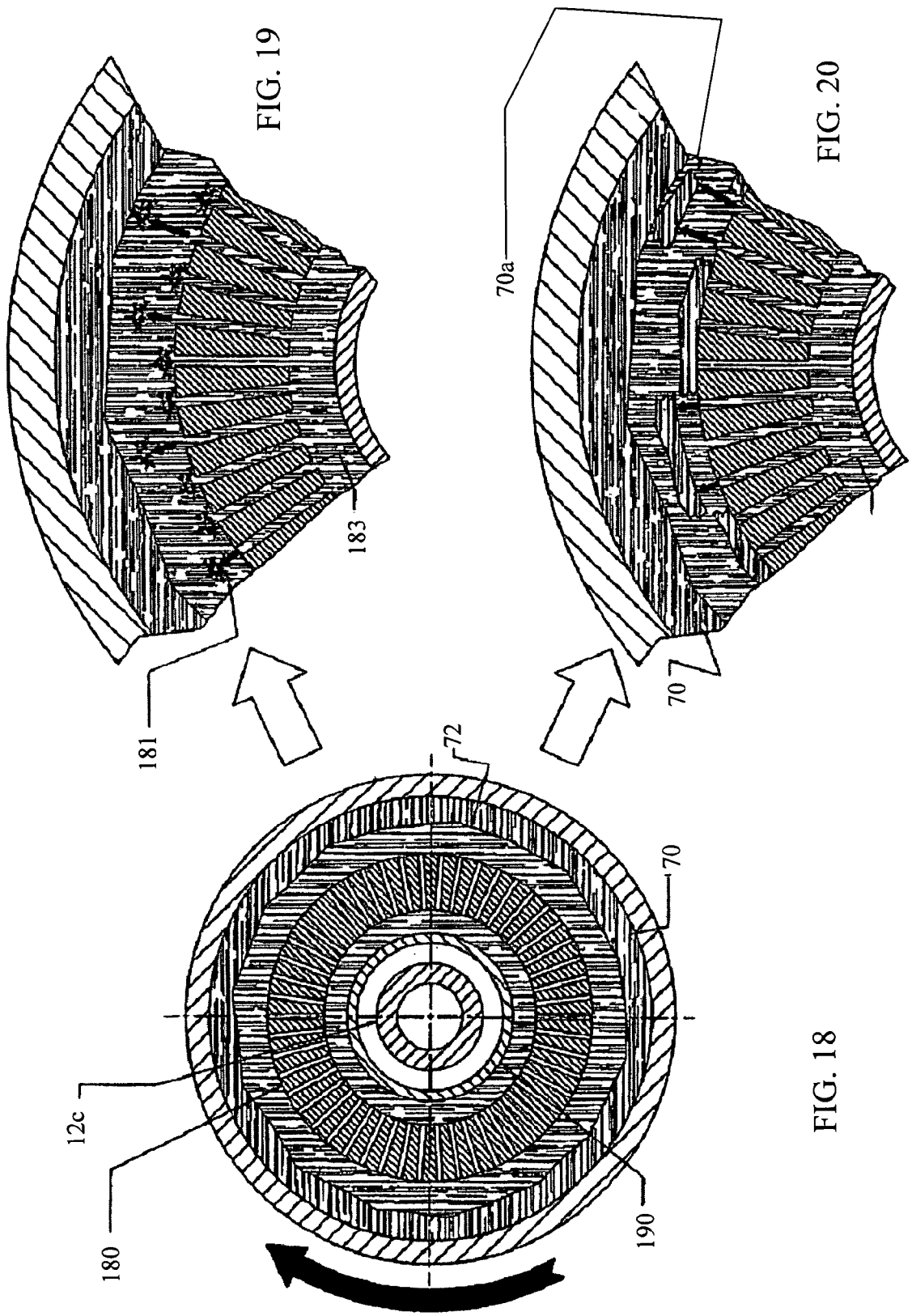
FIG. 18 shows is a section view of the centrifuge embodiment of FIG. 13 and depicts the passage of solids across the microfiltration membrane.
FIG. 19 shows is a section view of the centrifuge embodiment of FIG. 13 and depicts the passage of solids across the microfiltration membrane.
FIG. 20 shows is a section view of the centrifuge embodiment of FIG. 13 and depicts the passage of solids across the microfiltration membrane.

As shown in FIGS. 18, 19, and 20, fouling of the membrane can occur as feed liquid migrates through membrane pores 183 on the path towards the feed liquid exits (i.e. the innermost set of conduits in the cylindrical bowl upper end). The fouling may result from solids, carried by the feed liquid to the membrane outer surface, that form particulate 181 or whole or slime-like 70a deposits on the membrane. Due to the high rotation speeds, both the particulate and slime-like deposits eventually have sufficient mass to be forced away from the membrane outer surface by centrifugal action.

Various resilient and non-reactive seals are illustrated in the figures and are not discussed in detail here. The benefits associated with the semicircular bearing and bearing housing are discussed in a related patent application. Materials preferred for use in the system as shown are as described in the '280 application. The microfiltration membrane is preferably provided as sintered metal or ceramic.

While the present invention has been described in conjunction with a preferred embodiment, one of ordinary skill in the art, after reading the foregoing specification, will be able to effect various changes, substitutions of equivalents and other alterations to the compositions, articles, methods and apparatuses set forth herein. For example, fluid pressure may be replaced in other embodiments by, without limitation, an electromechanical force. Similarly, the lower portion and end of the piston and bowl, respectively, may not be conical in shape, although it is preferable for solids recovery that their shapes be complimentary.

Moreover, the invention also contemplates that the various passages, valves, pistons, actuators, assemblies, ports, members and the like described herein can be in any configuration or arrangement that would be suitable for operation of a centrifugal separator. The embodiments described above may also each include or incorporate any of the variations of all other embodiments. For example, the laser sensor assembly described herein can be used in conjunction with any or all of the embodiments of the present invention. It is therefore intended that the protection granted by Letter Patent hereon be limited only by the definitions contained in the appended claims and equivalents thereof.

What is claimed is:

1. A system for the isolation and recovery of solid and/or liquid components from a solids-containing suspension by combined microfiltration and centrifugation, the system comprising
a microfiltration subsystem and a centrifugation subsystem, the microfiltration subsystem comprising
a cross-flow microfilter, having a feed input for introduction of the suspension to the system, a filtrate output for diverting filtrate from the system, and a retentate output;
a retentate tank fed from the retentate output of the microfilter;
a retentate pump fed from an output of the retentate tank;
a first valve fluidly connected to the output of the retentate pump; and
a first sensor capable of sensing the solids concentration in the retentate and controlling the first valve, wherein below a first preset solids concentration the first valve returns the retentate to the feed input of the microfilter, and above the first preset solids concentration the first valve diverts the retentate to the centrifugation subsystem;
the centrifugation subsystem comprising
an automatic piston discharge centrifuge having a feed input, a solids discharge output for diverting solids from the system, and a centrate output;
a second valve fluidly connected to the centrate output; and
a second sensor capable of sensing the solids concentration in the centrate output and controlling the second valve, wherein above a second preset solids concentration the second valve returns the centrate to the retentate tank, and below the second preset solids concentration the second valve diverts the centrate from the system.

2. The system of claim 1, wherein the solids containing suspension is fed into the retentate tank.

3. The system of claim 1, wherein the first sensor measures turbidity or density of the retentate.

4. The system of claim 1, wherein the first sensor measures the filtrate pressure.

5. The system of claim 1, wherein the second sensor measures turbidity or density of the centrate.

6. The system of claim 1, wherein the second sensor controls the solids discharge cycle of the centrifuge.

7. The system of claim 1, further comprising a centrate tank, wherein the centrate is collected in the centrate tank.

8. The system of claim 1, wherein the filtrate and centrate are combined.

9. The system of claim 1, further comprising a centrate pump.

10. The system of claim 9, wherein the centrate pump routes centrate to the retentate tank.

11. The system of claim 9, wherein the centrate pump routes centrate out of the system.

12. The system of claim 1, further comprising a variable speed centrifuge feed pump whose input is fluidically connected to a first portion of the output of the retentate pump, the second portion of the output of the retentate pump being directed to the microfilter, and the output of the variable speed centrifuge pump being fluidically connected to the feed input of the centrifuge.

13. The system of claim 12, wherein the first sensor controls the variable speed pump.

14. The system of claim 13, wherein the first sensor measures turbidity or density of the retentate and controls the variable speed pump based on the turbidity or density of the retentate.

15. The system of claim 13, wherein the first sensor measures filtrate pressure and controls the variable speed pump based on the filtrate pressure.

16. The system of claim 1, wherein the microfiltration subsystem, the centrifugation subsystem, or both are temperature controlled.

17. An automatic piston discharge centrifuge, comprising:
a cylindrical bowl for a centrifuge having a lower end with an opening, the bowl being operative during a feed mode of operation to rotate at a high speed to separate solids from feed liquid, wherein solids accumulate along an inner surface of the bowl;
a solids discharge assembly comprising
a cylindrical outer piston movably disposed against the inner surface of the bowl, and
an inner piston disposed at the end of a shaft which extends along the axis of the bowl, the inner piston having a substantially cylindrical portion and a substantially conical portion;
a microfilter cylindrically disposed about the axis of the bowl, the microfilter retaining solids in an outer gap between an outer surface of the microfilter and the inner surface of the bowl, the microfilter allowing a filtered centrate to exit the bowl through an inner gap adjacent to an inner surface of the microfilter, the outer diameter of the microfilter being less than the inner diameter of the outer piston;
a diaphragm cylindrically disposed about the axis of the bowl and adjacent to the inner gap; and
a solids discharge valve at the lower end of the bowl.

18. The centrifuge of claim 17, wherein the microfilter comprises ceramic or sintered metal.

19. The centrifuge of claim 17, wherein during a solids discharge mode of operation pressurized gas or fluid moves independently the outer and inner pistons axially downward with respect to the bowl.

20. The centrifuge of claim 19, wherein first the outer piston is moved downward and then the inner piston is moved downward.

21. The centrifuge of claim 19, wherein during downward movement of the outer piston pressurized gas or liquid is introduced at an inner side of the diaphragm, the diaphragm closing the inner gap and sealing the inner surface of the microfilter.

22. The centrifuge of claim 17, wherein the bowl comprises a conical bottom portion.

23. The centrifuge of claim 22, wherein a lower face of the inner piston has a conical shape that complements the conical bottom portion of the bowl.

24. The centrifuge of claim 17, wherein the outer and inner pistons are spring biased in an upper position.

25. The centrifuge of claim 17, further comprising one or more ports for the introduction of pressurized gas or liquid.

26. The centrifuge of claim 17, wherein the solids discharge valve switches between an open position and a closed position by rotating on an axis orthogonal to the axis of bowl rotation.

27. The centrifuge of claim 17, wherein the solids discharge valve comprises a passage for introduction of feed liquid into the bowl.

28. The centrifuge of claim 17, wherein the solids discharge valve comprises a passage for draining residual liquid from the bowl after separation of feed solids and liquid.

29. The centrifuge of claim 17, further comprising a centrate valve having open and closed positions, wherein when the centrate valve is in the closed position a gas tight seal is formed between the centrate and an air gap between an outer surface of the bowl and a housing enclosing the bowl.

30. The centrifuge of claim 17, further comprising a solids valve seal between the solids discharge valve and a housing enclosing the bowl, the seal being inflatable with a pressurized gas or liquid.

31. A method of recovering a solid component or a liquid component from a solids-containing suspension by combined microfiltration and centrifugation, the method comprising the steps of:
providing a microfiltration subsystem and a centrifugation subsystem, the microfiltration subsystem comprising
a cross-flow microfilter, having a feed input for introduction of the suspension to the system, a filtrate output for diverting filtrate from the system, and a retentate output;
a retentate tank fed from the retentate output of the microfilter;
a retentate pump fed from an output of the retentate tank;
a first valve fluidly connected to the output of the retentate pump; and
a first sensor capable of sensing the solids concentration in the retentate;
the centrifugation subsystem comprising
an automatic piston discharge centrifuge having a feed input;
a solids discharge output for diverting solids from the system;
a centrate output;
a second valve fluidly connected to the centrate output; and
a second sensor capable of sensing the solids concentration in the centrate output and controlling the second valve;
adding the solids-containing suspension to the retentate tank;
pumping the suspension through the microfilter with the retentate pump;
sensing the solids concentration in the retentate with the first sensor, wherein if the solids concentration is below a first preset solids concentration, the first valve is adjusted to return the retentate to the feed input of the microfilter, and if the solids concentration is above the first preset solids concentration, the first valve is adjusted to divert the retentate to the centrifugation subsystem;
sensing the solids concentration in the centrate with the second sensor, wherein if the solids concentration is above a second preset solids concentration, the second valve returns the centrate to the retentate tank, and if the solids concentration is below the second preset solids concentration, the second valve is adjusted to divert the centrate for collection;
collecting filtrate from the microfilter;
collecting centrate from the centrifuge; and
collecting solids from the centrifuge.

32. A method of recovering a solid component from a solids-containing suspension by combined microfiltration and centrifugation, the method comprising the steps of:
providing an automatic piston discharge centrifuge, the centrifuge comprising
a cylindrical bowl for a centrifuge having a lower end with an opening, the bowl being operative during a feed mode of operation to rotate at a high speed to separate solids from feed liquid, wherein solids accumulate along an inner surface of the bowl;
a solids discharge assembly comprising
  a cylindrical outer piston movably disposed against the inner surface of the bowl, and
  an inner piston disposed at the end of a shaft which extends along the axis of the bowl, the inner piston having a substantially cylindrical portion and a substantially conical portion;
a microfilter cylindrically disposed about the axis of the bowl, the microfilter retaining solids in an outer gap between an outer surface of the microfilter and the inner surface of the bowl, the microfilter allowing a filtered centrate to exit the bowl through an inner gap adjacent to an inner surface of the microfilter, the outer diameter of the microfilter being less than the inner diameter of the outer piston;
a diaphragm cylindrically disposed about the axis of the bowl and adjacent to the inner gap; and
a solids discharge valve at the lower end of the bowl;
introducing the solids-containing suspension into the bowl during high-speed rotation of the bowl;
stopping the rotation of the bowl;
opening the solids discharge valve;
pressurizing the diaphragm against the inner surface of the microfilter; and
discharging accumulated solids from the inner surface of the bowl through the opening in the bowl by lowering first the outer piston and then the inner piston.

* * * * *